(12) United States Patent
Tetaz

(10) Patent No.: US 10,866,403 B2
(45) Date of Patent: Dec. 15, 2020

(54) COMPACT TELESCOPE HAVING A PLURALITY OF FOCAL LENGTHS AND COMPENSATED BY ASPHERICAL OPTICAL COMPONENTS

(71) Applicant: THALES, Courbevoie (FR)

(72) Inventor: Nicolas Tetaz, Cannes (FR)

(73) Assignee: THALES, Courbevoie (FR)

( * ) Notice: Subject to any disclaimer, the term of this patent is extended or adjusted under 35 U.S.C. 154(b) by 430 days.

(21) Appl. No.: 15/840,555

(22) Filed: Dec. 13, 2017

(65) Prior Publication Data
US 2018/0164573 A1 Jun. 14, 2018

(30) Foreign Application Priority Data

Dec. 13, 2016 (FR) ...................................... 16 01770
Mar. 9, 2017 (FR) ...................................... 17 00254

(51) Int. Cl.
*G02B 23/06* (2006.01)
*G02B 17/06* (2006.01)
(Continued)

(52) U.S. Cl.
CPC ............. *G02B 23/06* (2013.01); *G02B 7/183* (2013.01); *G02B 17/0631* (2013.01);
(Continued)

(58) Field of Classification Search
CPC ................ G02B 23/06; G02B 17/0642; G02B 27/0012; G02B 17/0694; G02B 26/06;
(Continued)

(56) References Cited

U.S. PATENT DOCUMENTS

| 4,101,195 A | * | 7/1978 | Frosch | ............... G02B 17/0631 |
| | | | | 359/366 |
| 4,993,818 A | * | 2/1991 | Cook | ................. G02B 17/0694 |
| | | | | 359/366 |

(Continued)

OTHER PUBLICATIONS

Z. Xin et al., "Three mirror anastigmatic zoom system using deformable mirrors," International Symposium on Photoelectronic Detection and Imaging 2011: Space Exploration Technologies and Applications, vol. 8196, No. 1, Jun. 9, 2011, pp. 1-8, XP060016106.
(Continued)

*Primary Examiner* — Stephone B Allen
*Assistant Examiner* — Rahman Abdur
(74) *Attorney, Agent, or Firm* — BakerHostetler

(57) ABSTRACT

A three-aspherical-mirror anastigmat telescope comprises means for moving the third mirror linearly along the optical axis of the telescope so as to make the focal length of the telescope change to a plurality of focal lengths between at least a minimum focal length and a maximum focal length, a plurality of aspherical optical components respectively associated with the plurality of focal lengths, the third mirror having a new conicity determined from an initial conicity, the new conicity being determined so that the telescope has, in the absence of the aspherical components and for the minimum and maximum focal lengths, aberrations that are compensable by the aspherical components, the position and the form of the surface of each aspherical component being determined so as to correct the compensable aberrations of the telescope for the associated focal length and to optimize image quality in the first focal plane of the telescope according to a preset criterion.

20 Claims, 24 Drawing Sheets

(51) Int. Cl.
  *G02B 27/00* (2006.01)
  *G02B 7/183* (2006.01)
  *G02B 26/06* (2006.01)
(52) U.S. Cl.
  CPC ..... *G02B 17/0642* (2013.01); *G02B 17/0694* (2013.01); *G02B 26/06* (2013.01); *G02B 27/0012* (2013.01); *G02B 27/0025* (2013.01)
(58) Field of Classification Search
  CPC . G02B 17/0631; G02B 27/0025; G02B 7/183
  USPC .......................................... 359/850–862, 399
  See application file for complete search history.

(56) References Cited

U.S. PATENT DOCUMENTS

| | | | |
|---|---|---|---|
| 5,144,476 A | 9/1992 | Kebo | |
| 6,084,727 A | 7/2000 | Cook | |
| 6,333,811 B1 | 12/2001 | Tatian et al. | |
| 7,292,385 B2* | 11/2007 | Dupuis | G02B 26/06 359/291 |
| 8,534,851 B2* | 9/2013 | Spencer | G02B 17/0631 359/859 |
| 8,746,884 B2* | 6/2014 | Saito | A61B 3/1015 351/205 |
| 2014/0327898 A1* | 11/2014 | Mann | G03F 7/70233 355/71 |

OTHER PUBLICATIONS

K. Seidl et al., "Wide field-of-view all-reflective objectives designed for multispectral image acquisition in photogrammetric applications," Optical Complex Systems, vol. 8172, 2011.

Korsch, "Reflective Optics", Chapter 10, pp. 261-264.

* cited by examiner

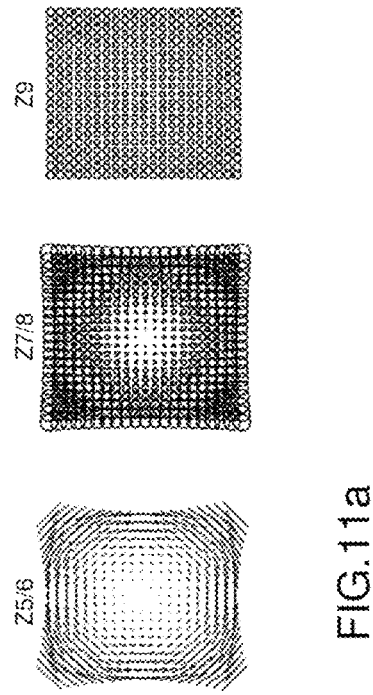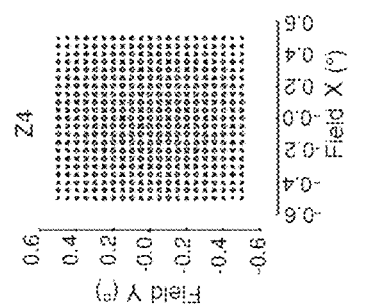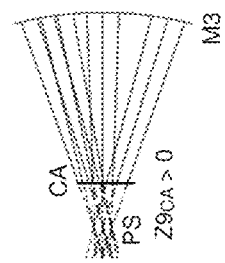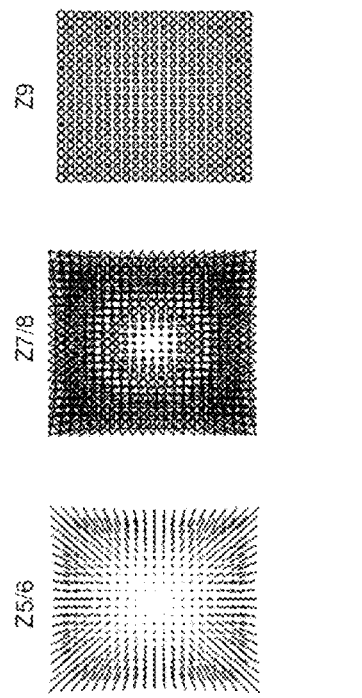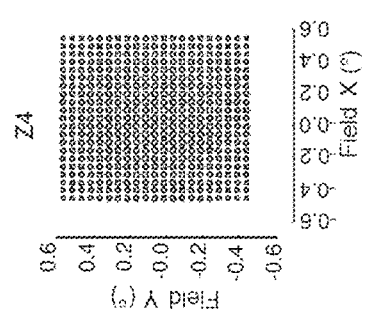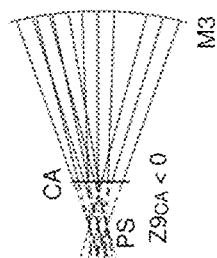
FIG.11a
FIG.11b

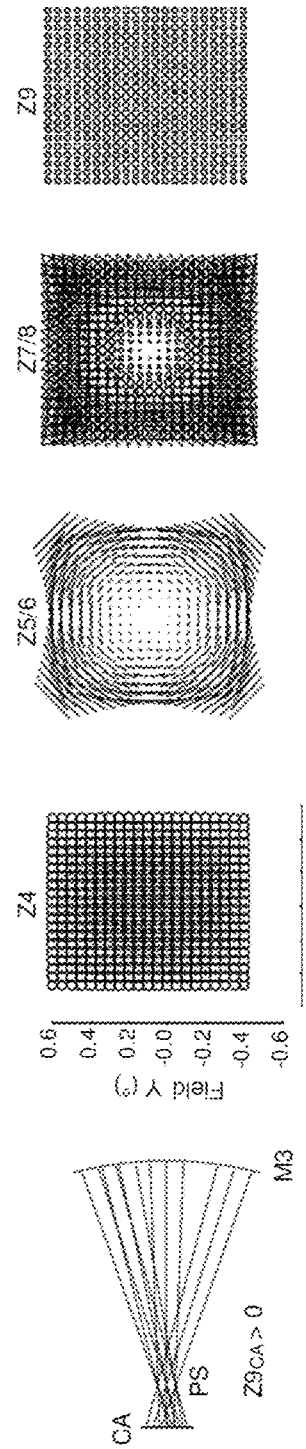
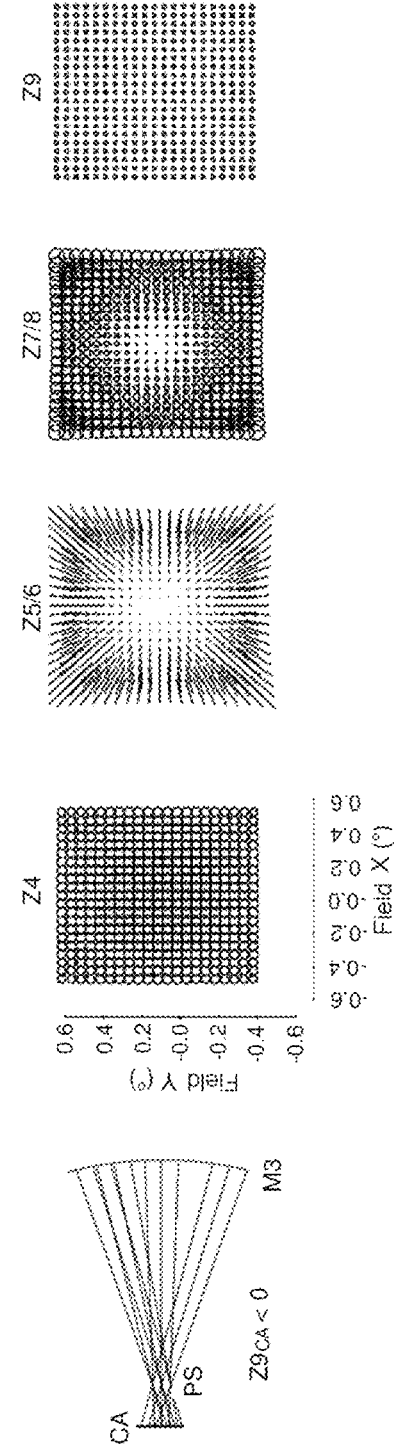
FIG.12a
FIG.12b

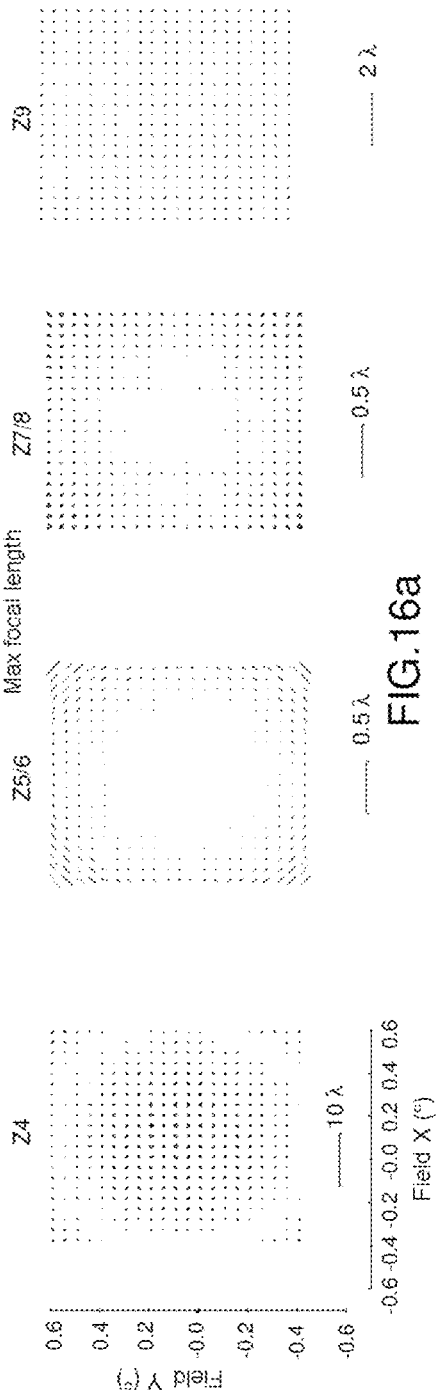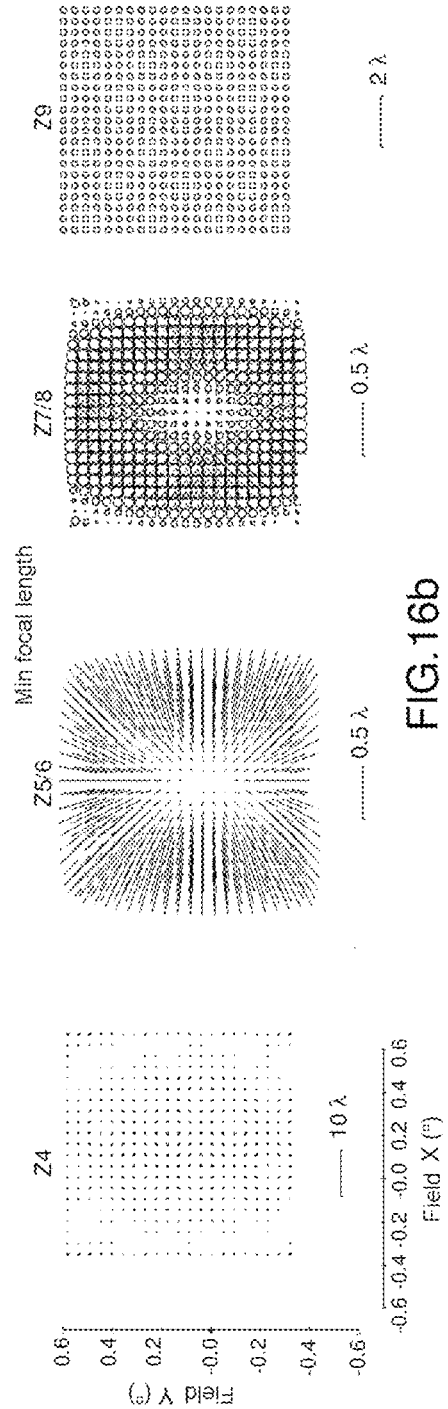

COMPACT TELESCOPE HAVING A PLURALITY OF FOCAL LENGTHS AND COMPENSATED BY ASPHERICAL OPTICAL COMPONENTS

CROSS-REFERENCE TO RELATED APPLICATIONS

This application claims priority to foreign French patent application Nos. FR 1700254, filed on Mar. 9, 2017 and FR 1601770, filed on Dec. 13, 2016, the disclosures of which are incorporated by reference in their entirety.

FIELD OF THE INVENTION

The field of the invention is that of telescopes, and in particular that of observation telescopes carried on board satellites. More precisely, the field of the invention relates to catoptric systems of large focal lengths.

BACKGROUND

Current space telescopes have a single focal length. One known type of telescope is the Korsch telescope. The Korsch telescope, also referred to as a three-mirror anastigmat (TMA) telescope, is a type of anastigmatic telescope comprising (in concave-convex-concave order) three aspherical mirrors i.e. at least a concave first mirror M1, a convex second mirror M2 and a concave third mirror M3. These three mirrors are aspherical and they have forms that are conventional in such telescopes. The first, second and third mirrors M1, M2 and M3 are aspherical, of set forms, each mirror being characterized by at least two parameters, a radius of curvature R and a conicity c.

This optical system has, as is well known in the art, an optical axis O that is defined by the ray passing through the center of the entrance pupil $P_E$ and perpendicular to this pupil.

The three mirrors M1, M2 and M3 are arranged so that the first mirror and the second mirror form from an object at infinity an intermediate image in an intermediate focal plane $P_{FI}$ located between the second mirror and the third mirror, the third mirror forming from this intermediate image a final image in the focal plane $P_F$ of the telescope, in which plane a detector D is placed. By applying the Korsch equations, which are well known in the art, the respective parameters and positions of the three mirrors may be easily calculated. The theoretical solution is of high quality, this being the key benefit of this type of telescope.

The quality of an optical system may be evaluated by comparing an ideal diffraction-limited light wave and the actual light wave output from the optical system i.e. affected by defects in the optical system passed through. Analysis of the difference between the theoretical wave and the actual wave allows the types of defects or aberrations in the optical system to be identified.

It is known that the main types of geometrical aberration are: spherical aberration, astigmatism, coma, field curvature (defocus in the field) and distortion.

Polynomials, and more particularly Zernike polynomials, are conventionally used to more easily qualify the various types of aberrations in a wavefront (i.e. a surface) output from an optical system.

Zernike surfaces are the most commonly used. A Zernike surface is defined in polar coordinates in a space ($\rho$, $\theta$, z), and if z($\rho$, $\theta$) is the z-coordinate of a point on this surface, the following relationship holds:

$$z(\rho, \theta) = \frac{c(\rho^2)}{1 + \sqrt{1 - (1 + k) c^2 \rho^2}} + \sum C_j Z_j \quad (1)$$

Zj being a Zernike polynomial of order j and Cj being the constant associated with this polynomial, j being an index respectively varying between 0 and an integer number, k being the conic constant and c the curvature of the surface.

A given surface represented by these polynomials is referred to as a φ-polynomial surface. This surface is therefore characterized by the values of the coefficients of these polynomials.

The advantage of representing wavefronts with orthogonal Zernike polynomials is that each polynomial of the considered basis corresponds to a different category of geometric aberration. It is thus possible to determine the nature of the aberrations present in a wavefront.

Table I below gives the various "fringe Zernike" polynomials as a function of their order (1 to 16), and the corresponding type of aberration.

TABLE 1

| Order | Polynominal | Aberration (s) |
|---|---|---|
| 1 | 1 | Piston |
| 2 | $\rho \cos[\theta]$ | Tilt in x |
| 3 | $\rho \sin[\theta]$ | Tilt in y |
| 4 | $-1 + 2 \rho^2$ | Defocus |
| 5 | $\rho^2 \cos[2\theta]$ | Astigmatism at 0° |
| 6 | $\rho^2 \sin[2\theta]$ | Astigmatism at 45° |
| 7 | $\rho (-2 + 3 \rho^2) \cos[\theta]$ | Coma in x |
| 8 | $\rho (-2 + 3 \rho^2) \sin[\theta]$ | Coma in y |
| 9 | $1 - 6 \rho^2 + 6 \rho^4$ | Spherical aberration and defocus |
| 10 | $\rho^3 \cos[3\theta]$ | Trefoil |
| 11 | $\rho^3 \sin[3\theta]$ | Trefoil |
| 12 | $\rho^2 (-3 + 4 \rho^2) \cos[2\theta]$ | 2nd-order astigmatism |
| 13 | $\rho^2 (-3 + 4 \rho^2) \sin[2\theta]$ | 2nd-order astigmatism |
| 14 | $\rho (-3 + 12 \rho^2 + 10 \rho^4) \cos[\theta]$ | 2nd-order coma in x |
| 15 | $\rho (-3 + 12 \rho^2 + 10 \rho^4) \sin[\theta]$ | 2nd-order coma in y |
| 16 | $-1 + 12 \rho^2 - 30 \rho^4 + 20 \rho^6$ | 2nd-order spherical aberration |

Adopting the paradigm of fringe Zernike polynomials, the various types of aberration correspond to the following terms:
  defocus corresponds to the term Z4;
  astigmatism corresponds to the terms Z5 and Z6;
  coma corresponds to the terms Z7 and Z8;
  first-order spherical order aberration corresponds to Z9; and
  second-order spherical aberration corresponds to Z16.

Conventionally, as illustrated in FIG. 1 for a single-focal-length TMA, it is known to improve the image quality of optical instruments by placing a deformable mirror MD level with the exit pupil, such a mirror commonly being referred to as a free-form surface.

However, the theoretical solution of the 3-mirror Korsch telescope being of very high quality, this type of mirror does not form an integral part of the optics of this type of telescope and is used only to compensate for defects due to imperfections in the actual system post-manufacture with respect to the theoretical solution (atmospheric turbulence, defects in the mirror M1). Thus, generally a deformable mirror is used at the exit pupil in order to correct for constant field aberrations. When it is positioned at the pupil of an instrument, deformation of the deformable mirror by addition of a Zernike polynomial introduces constant field aberrations. For example, if a polynomial Z5 of nonzero value is added to the deformable mirror, each point of the field will be impacted by astigmatism.

In the general case, the surface S that the deformable mirror must have in order to allow defects to be corrected is referred to as a free-form surface, meaning that it is not axisymmetric (see the general formula (1) and table I).

Formula (1) is a mathematical basis of orthogonal polynomials allowing a surface, which may be axisymmetric, to be defined.

An aspherical surface is an axisymmetric surface that cannot be described by a single radius of curvature (like a sphere) because local curvature changes over the surface.

The conventional definition of an aspherical surface defined in a space (ρ, z) is:

$$Z = \frac{\frac{\rho^2}{R}}{1 + \sqrt{1 - (1+k) \cdot \frac{\rho^2}{R^2}}} + A \cdot \rho^4 + B \cdot \rho^6 + C \cdot \rho^8 + \ldots \quad (2)$$

R being the radius of curvature, k the conic constant, and the terms A, B and C aspheric coefficients of 4th, 6th and 8th order.

By comparing formula (1) and table I with formula (2), it may be seen that an aspherical surface represented in the form of Zernike polynomials has a Z4, Z9 and Z16 component (fringe Zernike polynomials dependent on ρ only, i.e. only axisymmetric) and no Z5, Z6, Z7, Z8, Z10 to Z15 components (coefficients dependent on θ), the latter coefficients therefore being zero for this type of surface.

When a deformable and controllable mirror MD is used to compensate for the aberrations of a system, it is possible to obtain any desired surface by controlling the mirror, the desired surface of the MD being calculated so as to compensate for defects in the actual system. The desired surface is decomposed into polynomials, and this surface is generated by applying in a controlled way the right coefficients via the system for controlling the mirror. The shape of the surface may then be changed by modifying the values of the coefficients.

It is thus possible, by directly controlling the values of the coefficients Cj, to introduce into the design the wanted aberrations.

Moreover, it may be advantageous to be able to change focal length on-the-fly. Specifically, changing focal length on-the-fly allows the field of view and/or resolution of the image to be changed with one and the same instrument.

Present-day telescopes may be divided into two families:
telescopes with two focal lengths, which can capture either a high-resolution image of a narrow field or a lower-resolution image of a wider field; and
telescopes comprising a continuous all-reflective zoom that allow focal length to be changed on-the-fly.

By way of examples of two-focal-length telescopes, mention may be made of telescopes that are based on separation of a common channel into two channels of different focal lengths. The separation may be achieved spectrally: a given field is separated by a dichroic plate if the wavelength domain allows such a spectral separation (e.g.: visible and infrared). It may be achieved by separating the received flux into a reflected flux and a transmitted flux by means of an optical density, if it is a question of a wavelength domain that is not separable spectrally (e.g.: 50% of the flux is reflected, 50% transmitted).

Advantages of these Two-Focal-Length Solutions Employing Common Channel Separation:
Two focal lengths simultaneously;
Observation of a common field of view.
Drawbacks of these Solutions:
Addition of optical elements (dichroic plate/density+mirrors/specific lenses to each of the channels);
Detectors specific to each channel;
If the spectral domain of the channels is not separable spectrally, a substantial amount of the flux will necessarily be lost;
Only two focal lengths.

Mention may also be made of telescopes in which the field of view is divided: the two channels then do not receive the same field of view.

Advantage of these Two-Focal-Length Solutions Employing Field-of-View Division:
Two focal lengths simultaneously.
Drawbacks of these Solutions:
Addition of optical elements: mirrors/specific lenses to each of the channels;
Detectors specific to each channel;
Observation of a different field of view;
Only two focal lengths.

Another two-focal-length solution, described in U.S. Pat. No. 6,084,727, allows the focal length of the telescope to be changed by inserting reflective elements on the optical path.

Advantages of this Solution Employing Insertion of Reflective Elements:
A single detector;
Observation of a common field of view.
Drawbacks of this Solution:
Addition of optical elements: specific mirrors, to one of the channels;
Only two focal lengths;
Two focal lengths but not simultaneously.

By way of example of a telescope comprising a continuous all-reflective zoom, mention may be made of the telescope described in U.S. Pat. No. 6,333,811; it is based on a Cassegrain telescope with variable-magnification image relay thereby allowing a continuous zoom to be obtained.

Advantages of this Solution:
A single detector;
Continuous zoom;
Observation of a common field of view;
No modification of the shape of the mirrors.
Drawbacks of this Solution:
The number of mirrors: 7 mirrors, 3 of which are aspherical, 2 of which are free-form and 1 of which is a planar relay mirror;
Movement of two free-form mirrors which may be position-sensitive;
Telescope of Cassegrain type and therefore of limited field.

Moreover, zooms exist that use mirrors having deformable radii of curvature, an example of which is described in the publication by Kristof Seidl et al.: "Wide field-of-view all-reflective objectives designed for multispectral image acquisition in photogrammetric applications".

Advantages of this Solution:
A single detector;
Continuous zoom;
Observation of a common field of view;
No movement of the mirrors.
Drawbacks of this Solution:
Too bulky for long focal lengths, for example larger than 10 m;

Deformable mirrors work only with spherical mirrors of small diameters of about a few cm: they are therefore not compatible with the pupil sizes of space telescopes, typically larger than 0.5 m.

Thus, no multi-focal-length TMA telescope that does not use expensive components such as deformable mirrors is currently able to provide a very high optical quality at all its focal lengths.

One aim of the present invention is to mitigate the aforementioned drawbacks by providing a compact multi-focal-length telescope that comprises three aspherical mirrors and one detector and that works with large pupil diameters, has a larger field of view than that of a Cassegrain (>1°), and that obtains a very high image quality at all its focal lengths even though it is compensated with "conventional" aspherical components not having a "free-form" deformable function.

SUMMARY OF THE INVENTION

One subject of the present invention is a three-aspherical-mirror anastigmat telescope comprising at least a concave first mirror, a convex second mirror, a concave third mirror and a first detector, and having an optical axis, the three mirrors being arranged so that the first mirror and the second mirror form from an object at infinity an intermediate image between the second mirror and the third mirror, the third mirror forming from this intermediate image a final image in a first focal plane of the telescope, in which plane the first detector is placed, the first, second and third mirrors being of a set form characterized by at least a radius of curvature and a conicity, the telescope further comprising:

means for moving the third mirror linearly along the optical axis of the telescope so as to make the focal length of the telescope change to a plurality of focal lengths between at least a minimum focal length and a maximum focal length, the telescope having at the minimum focal length a first exit pupil in a first position, and the telescope having at the maximum focal length a second exit pupil in a second position, a plurality of aspherical optical components respectively associated with the plurality of focal lengths, said components being respectively placed in a plurality of positions located between the first and second position, each aspherical component being placed on an optical path of a beam corresponding to said associated focal length when the telescope is working at said associated focal length, and off the optical path associated with another focal length when the telescope is working at said other focal length, means for changing the optical path, which means are placed between the aspherical components and the first detector and configured so that the detector remains positioned in the first focal plane of the telescope, the third mirror having a new conicity determined from an initial conicity, the initial conicity being determined from the Korsch equations, the new conicity being determined so that the telescope has, in the absence of said aspherical components and for the minimum and maximum focal lengths, aberrations that are compensable by said aspherical components, the position and the form of the surface of each aspherical component being determined so as to correct said compensable aberrations of said telescope for the associated focal length and to optimize image quality in the first focal plane of the telescope according to a preset criterion.

Preferably, the form of the surface of each aspherical component comprises first-order spherical aberration and defocus.

Preferably, the form of the surface of each aspherical component furthermore comprises a second-order spherical aberration in order to further improve image quality according to said criterion.

Advantageously, the new conicity differs from the initial conicity by more than 5% and by less than 30%.

According to one embodiment, a new conicity of the first mirror and a new conicity of the second mirror are respectively determined from an initial conicity of the first mirror and an initial conicity of the second mirror, the initial conicities being determined from the Korsch equations, the new conicities being determined so as to further improve the image quality of said telescope according to said criterion.

Preferably, each surface of an a spherical component is defined using the coefficients of the fringe Zernike polynomials $Z4$, $Z9$ and where appropriate $Z16$.

According to one embodiment, the compensable aberrations are astigmatism and coma.

According to one embodiment:

a positive astigmatism is defined as an astigmatism for which a tangential focal point is located before a sagittal focal point, a negative astigmatism is defined as an astigmatism for which a sagittal focal point is located before a tangential focal point, a positive coma is defined as a coma for which a shape of the image spot of a point source is a "comet" the tail of which is directed away from the optical axis and, a negative coma is defined as a coma for which a shape of the image spot of a point source is a "comet" the tail of which is directed toward the optical axis, the compensable aberrations being positive astigmatism and positive coma for the maximum focal length, and positive astigmatism and negative coma for the minimum focal length.

Preferably, the new conicity of the third mirror is determined so as to modify the sign of the astigmatism of the telescope for the minimum focal length, in the absence of aspherical components.

Preferably, the preset criterion consists in minimizing a wavefront error.

Preferably, said positions of the aspherical components are separated from one another by 50 mm at most.

According to one embodiment at least one aspherical component is retractable so as to be placed on the optical path of the beam corresponding to the associated focal length when the telescope is working at said associated focal length, and off the optical paths associated with the other focal lengths when the telescope is working at one of these other focal lengths.

Advantageously, the aspherical optical components are retractable mirrors.

Advantageously, the retractable mirrors are mounted on a single holder, the positions of the retractable mirrors then being substantially identical.

According to one embodiment, the aspherical components are retractable mirrors mounted on a single holder, the holder furthermore comprising a position in which no retractable mirror features on the optical path of the beam incident on said holder, the beam then passing through the holder along a secondary optical path, the telescope furthermore comprising:
an optical device placed on the secondary optical path and configured to generate a second focal plane of the telescope corresponding to a chosen focal length, said optical device furthermore being configured to correct said compensable aberrations of said telescope and to optimize the image quality in the second focal plane of the telescope according to said preset criterion and,
a second detector placed in the second focal plane of the telescope, and sensitive in a second spectral band that is different from a first spectral band of sensitivity of the first detector.

Advantageously, the optical device is designed to work in transmission in the second spectral band, the first spectral band is comprised in the visible and the second spectral band is comprised in the infrared, and the chosen focal length has a value lower than the minimum focal length.

According to another embodiment, at least one aspherical component is a plate working in transmission.

According to one variant, the telescope according to the invention has only two focal lengths, the minimum focal length and the maximum focal length.

BRIEF DESCRIPTION OF THE DRAWINGS

Other features, aims and advantages of the present invention will become apparent on reading the detailed description which will follow and with regard to the appended drawings given by way of non-limiting example and in which:

The aforementioned

FIG. 2a illustrates the optical system for the maximum focal length and FIG. 2b illustrates the optical system for the minimum focal length.

FIG. 3a illustrates the optical system for the maximum focal length and FIG. 3b illustrates the optical system for the minimum focal length.

FIG. 5a illustrates these aberrations when the telescope is working at the maximum focal length, and FIG. 5b illustrates these aberrations when the telescope is working at the minimum focal length.

FIGS. 11a and 11b illustrate, for the initial system, the aberrations that result following the introduction of spherical aberration $Z9_{CA}$ into an aspherical component CA as a function of its relative position with respect to the effective exit pupil, when CA is placed downstream of the effective exit pupil. FIG. 11a corresponds to $Z9_{CA}<0$ and FIG. 8b to $Z9_{CA}>0$.

FIGS. 12a and 12b illustrate, for the initial system, the aberrations resulting following the introduction of spherical aberration $Z9_{CA}$ into an aspherical component CA as a function of its relative position with respect to the effective exit pupil, when CA is placed upstream of the effective exit pupil. FIG. 12a corresponds to $Z9_{CA}<0$ and FIG. 12b to $Z9_{CA}>0$.

FIGS. 16a and 16b illustrate the various aberrations in the first focal plane of a telescope according to the invention, the mirror M3 of the telescope having a new conicity c'3 and the deformable mirror of the telescope having a median position Pm and optimized values of $Z9_{MD}$ and of $Z4_{MD}$ ($Z9_{MD/max}$ and $Z9_{MD/min}$; $Z4_{MD/max}$ and $Z4_{MD/min}$). FIG. 16a illustrates the various aberrations for the max focal length and FIG. 16b for the min focal length.

FIG. 20a illustrates the various aberrations for the max focal length and FIG. 20b for the min focal length.

DETAILED DESCRIPTION OF THE INVENTION

We will first of all describe a Korsch telescope with multi-focal-length capability. FIGS. 2 and 3 illustrate a multi-focal-length 3-mirror Korsch telescope 20, the focal length being made to change via movement of the third mirror M3 along the optical axis of the telescope O using means 5 for creating a linear movement. Document U.S. Pat. No. 4,993,818 briefly describes the principle of such a system. A telescope of this type is usable in a space environment, but also on the ground for observation or surveillance.

The movement of the mirror M3 between two extreme positions Pmin and Pmax allows focal length to be varied between a minimum focal length fmin and a maximum focal length fmax, respectively. The instrument has at least two focal lengths fmin and fmax and is capable of working at intermediate focal lengths, via movement of the mirror M3.

Figure 1:
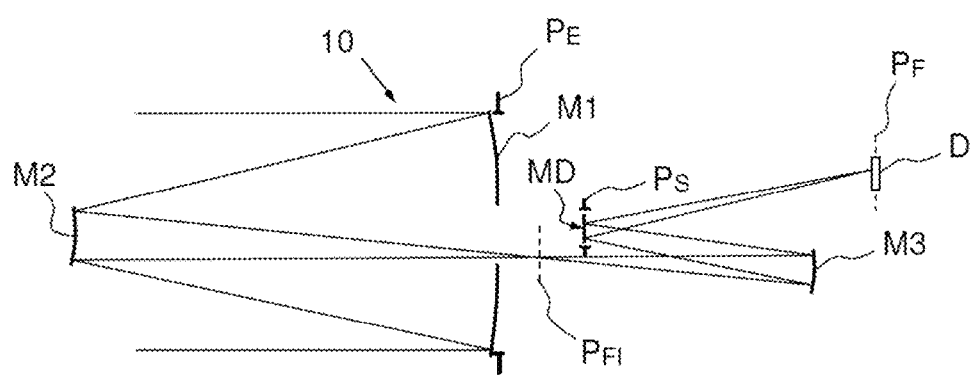
FIG. 1 illustrates a single-focal-length Korsch telescope with a deformable mirror placed level with the exit pupil of the telescope.
Figure 2A:
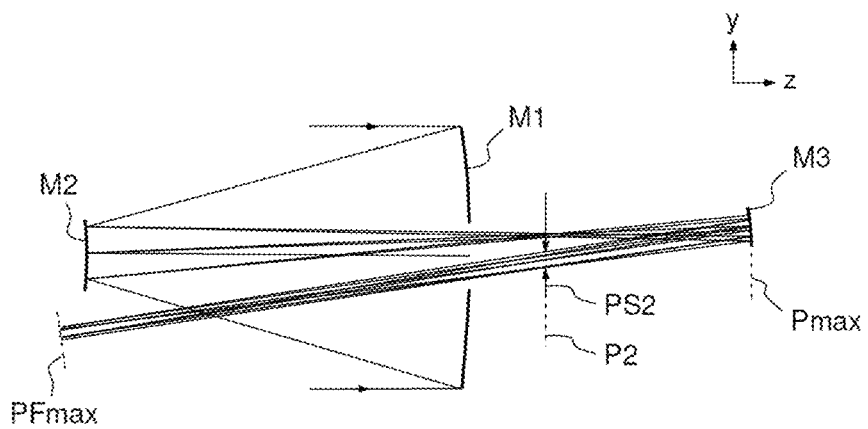
FIGS. 2a and 2b illustrate a multi-focal-length Korsch telescope seen in a YZ plane, the focal length being made variable via movement of the third mirror along the optical axis.
Figure 2B:
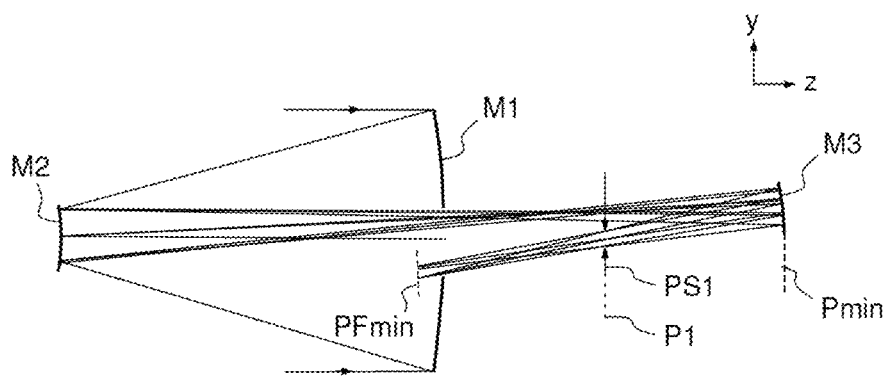
Figure 3A:
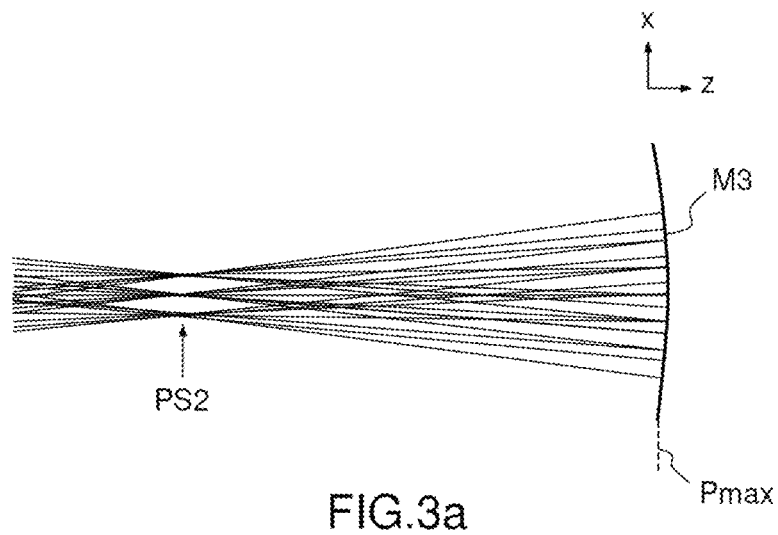
FIGS. 3a and 3b illustrate the telescope of FIGS. 2a and 2b seen in the XZ plane.
Figure 3B:
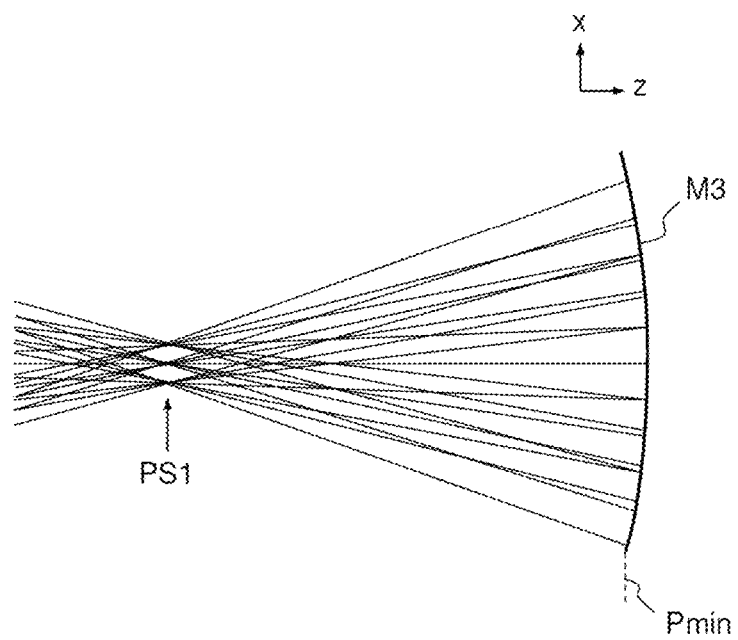

FIGS. 2a and 2b illustrate the telescope seen from the side in a YZ plane, FIG. 2a illustrating the telescope working with the maximum focal length and FIG. 2b with the minimum focal length. FIGS. 3a and 3b illustrate the telescope seen from the side in a XZ plane, FIG. 3a illustrating the telescope working with the maximum focal length and FIG. 3b with the minimum focal length.

For M3 at one of the extreme positions Pmin, the telescope has the minimum focal length fmin, a first exit pupil PS1 in a first position P1 and a focal plane PFmin (FIGS. 2b, 3b). For M3 at the other extreme position Pmax, the telescope has the maximum focal length fmax, a second exit pupil PS2 in a second position P2 and a focal plane PFmax (FIGS. 2a, 3a).

Since the position of the focal plane of the telescope varies with focal length, it is necessary to integrate means for changing the optical path between the third mirror M3 and the detector D, which are configured so that the detector remains positioned in the focal plane of the telescope. These means are described below for the case of a standard multi-focal-length telescope 20, and will be applied, further on, to a telescope according to the invention.

Figure 4A:
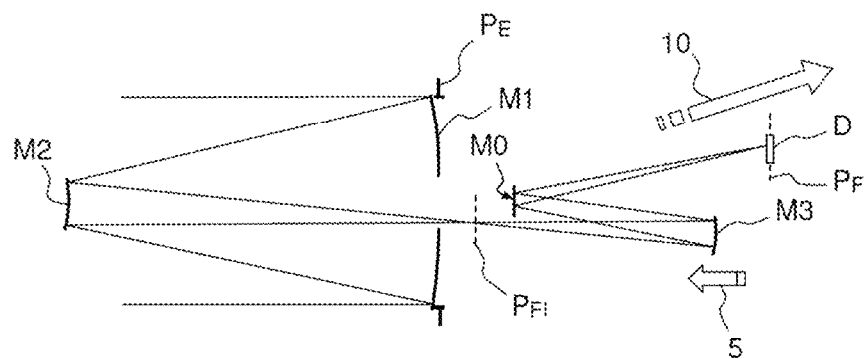
FIG. 4a illustrates a first variant of means for changing the optical path between the third mirror and the detector D.

According to a first variant, the means for changing the optical path between the third mirror M3 and the detector D include means 10 for translating the detector D along the optical axis O, such as illustrated in FIG. 4a. A planar mirror M0 allows the beam to be folded in order to increase the overall compactness of the optical system and/or to solve problems with bulk.

Figure 4B:
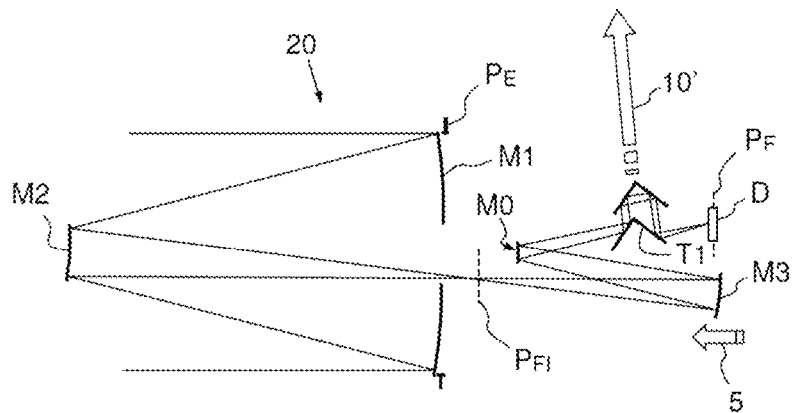
FIG. 4b illustrates a second variant of means for changing the optical path between the third mirror and the detector D, in which variant the detector D remains stationary, the means for changing the optical path comprising two roof-shaped mirrors T1 and T2, for one position of the mirror T2.
Figure 4C:
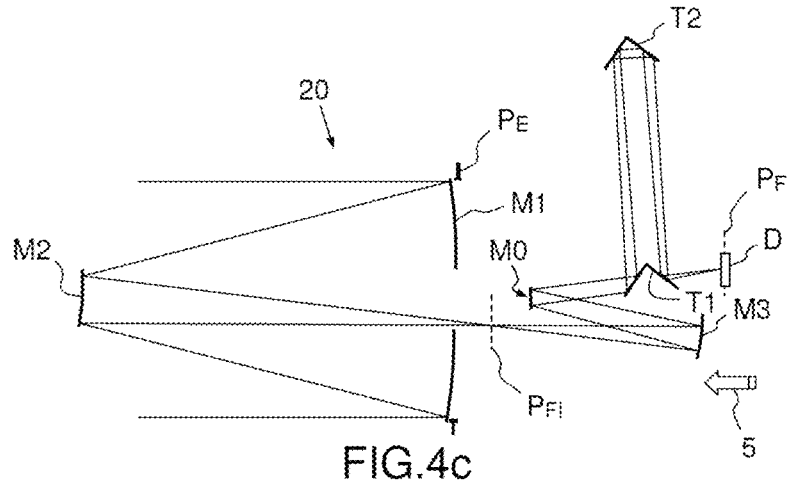
FIG. 4c illustrates the second variant of means of changing the optical path between the third mirror and the detector D, in which variant the detector D remains stationary, the means for changing the optical path comprising two roof-shaped mirrors T1 and T2, for another position of the mirror T2.

According to a second variant, which is illustrated in FIGS. 4b and 4c, the detector D remains stationary and the means for changing the optical path comprise two roof-shaped mirrors T1, T2 (i.e. two mirrors having two faces at about 90° to each other) located between the third mirror M3 and the detector D, and means 10' for translating one of the two roof-shaped mirrors, T2 in the example, the other remaining stationary, linearly along an axis that is not parallel to the optical axis, so as to make the optical path change. The sides of the "roof" of T1, which preferably have a slope of 45°, are not necessarily parallel to those of T2.

FIG. 4b illustrates a first position of the roof-shaped mirror T2 corresponding to a first position of the mirror M3 (short focal length), and FIG. 4c illustrates a second position of the roof-shaped mirror T2 corresponding to a second position of the mirror M3 (longer focal length). A planar mirror M0 allows the beam to be folded in order to increase the overall compactness of the optical system and/or to solve problems with bulk.

Figure 4D:
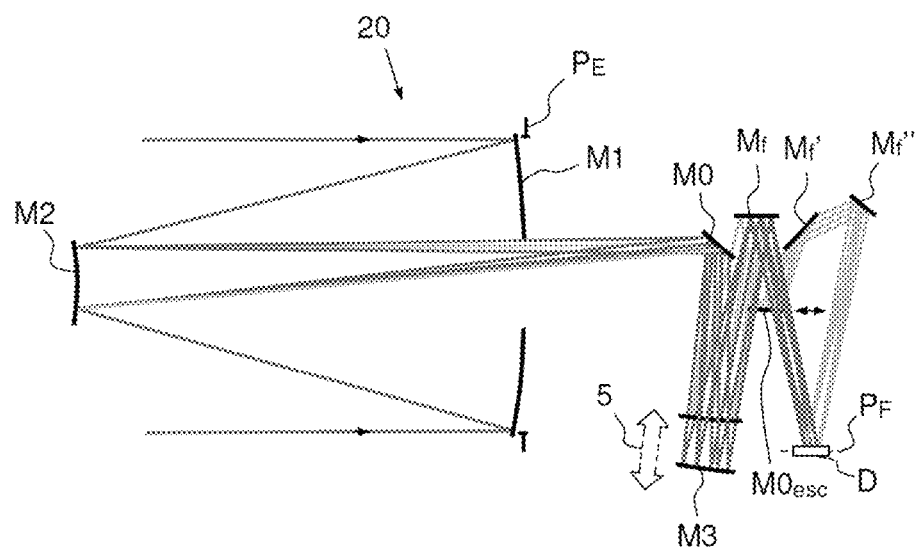
FIG. 4d illustrates a third variant in which the means for changing the optical path between the third mirror and the detector D comprise stationary conventional mirrors and at least one retractable conventional mirror.

A third variant, which is illustrated in FIG. 4d, is particularly suitable when the telescope is bifocal, i.e. it has only two focal lengths, the focal length fmin and the focal length fmax. The light beam corresponding to operation at fmin is in dark grey, and the light beam corresponding to operation at fmax is in lighter grey. The means for changing the optical path comprise stationary conventional mirrors Mf, Mf' and Mf" and at least one retractable conventional mirror Mesc. The mirror Mf is placed on the optical paths of the two beams. The retractable mirror is retracted when the telescope is working at fmin and is positioned on the optical path of the beam when the telescope is working at fmax. The fold mirrors Mf' and Mf" positioned on the optical path of the beam reflected by Mesc allow a focal plane PFmax to be obtained in the same location as PFmin, where the detector D is positioned.

In order to allow the reasoning that led to the invention to be better understood, we will firstly describe the way in which a Korsch telescope having a plurality of focal lengths fi (i index from 1 to n) is designed. The focal length fmin corresponds to f1 and the focal length fmax corresponds to fn. For a two-focal-length telescope n=2, i.e. the telescope works only at fmin=f1 and fmax=f2.

Parameters, called initial parameters, which are compatible both with the minimum focal length fmin and the maximum focal length fmax are determined, for the first, second and third mirrors, with a known prior-art ray-tracing software package.

Thus, using the Korsch equations, initial radii of curvature and conicities are determined for the two extreme focal lengths of our zoom.

For example, it is possible to solve the Korsch equations simultaneously for the two focal lengths fmin and fmax by using an identical radius of curvature R1 for the two focal lengths.

The starting point therefore consists of the values: R1, R2_fmax, R2_fmin, R3_fmax, R3_fmin, C1_fmax, C1_fmin, C2_fmax, C2_fmin, C3_fmax, C3_fmin.

The next stage of the optimization consists in constraining the radii of curvature and the conicities for the 2 extreme focal lengths fmin and fmax to be identical.

The optimization is carried out in a conventional way using ray-tracing software packages (CodeV, Zemax, Oslo, etc.). These software packages are based on the principle of minimization of an error function. Typically, the error function includes the image quality in the focal plane and the constraint of the focal lengths fmin and fmax.

Thus, with a first optimization of the image quality in the focal plane of the telescope according to a preset criterion, the initial parameters are determined:
Initial radii of curvature: R1, R2, R3 for M1, M2 and M3, respectively
Initial conicities: C1, C2, C3 for M1, M2 and M3, respectively.

The preset criterion for example consists in minimizing a wavefront error or WFE averaged over a plurality of points of the field, this type of criterion being well known in the art. Typically, it is sought to minimize the root-mean-square value or RMS WFE.

In this type of solution, the forms of the mirrors M1, M2 and M3, which are characterized by the parameters radius of curvature R and conic constant c (here it has been chosen not to take into consideration higher order terms that cause no improvement), respect the equations established by Mr. Korsch, in order to obtain an aplanatic and anastigmatic solution, without field curvature. However, these equations cannot be rigorously solved simultaneously for the two focal lengths fmin and fmax.

A compromise must be made and image quality suffers as a result. Image quality remains acceptable for telescopes the volume of which is not greatly constrained (i.e. telescopes in which the rays are incident on the mirrors at small angles). In the field of space systems and solutions, it is essential to constrain volume. This solution is therefore not envisionable for space instruments of large focal length and pupil size i.e. in which the rays are incident on the mirrors at large angles.

An illustrative example is a two-focal-length telescope with:
Max focal length=37.5 m
Min focal length: 15 m
Ratio of the zoom: 2.5
Diameter of the mirror M1: 1.1 m
Distance between M1 and M2: 1600 mm
Distance between the two extreme positions of M3: 250 mm
Distances between PS1 and PS2: 250 mm
Distance between PFmax and PFmin: 1600 mm (PF: focal plane).

The step of determining the initial parameters via a first optimization such as described above results in an initial telescope configuration in which the initial parameters have the following values:
R1=4000 mm c1=−1
R2=1000 mm c2=−2.1
R3=1200 mm c3=−0.61

Figure 5A:
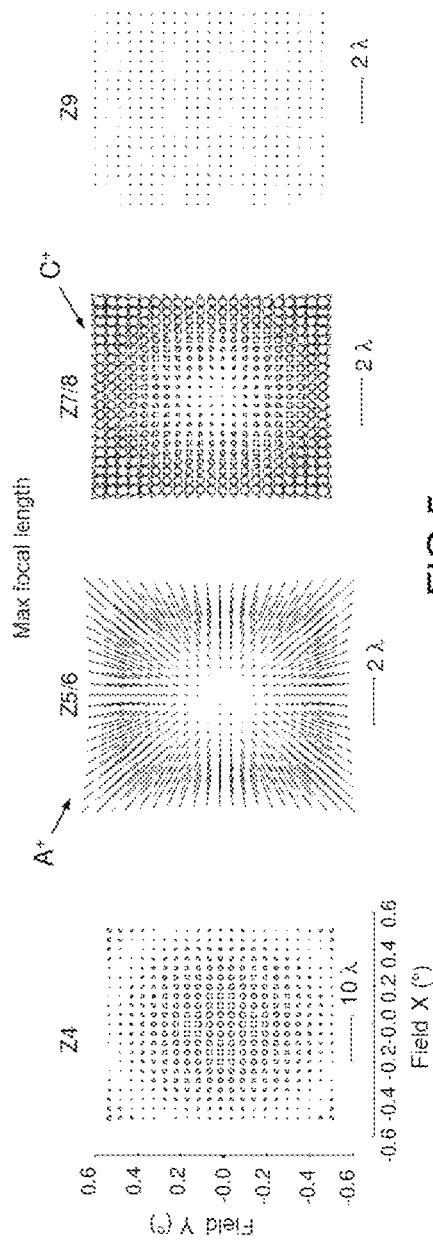
FIGS. 5a and 5b illustrate the aberrations present in the focal plane for a two-focal-length telescope the aspherical mirrors M1, M2 and M3 of which have initial parameters obtained by solving the Korsch equations.
Figure 5B:
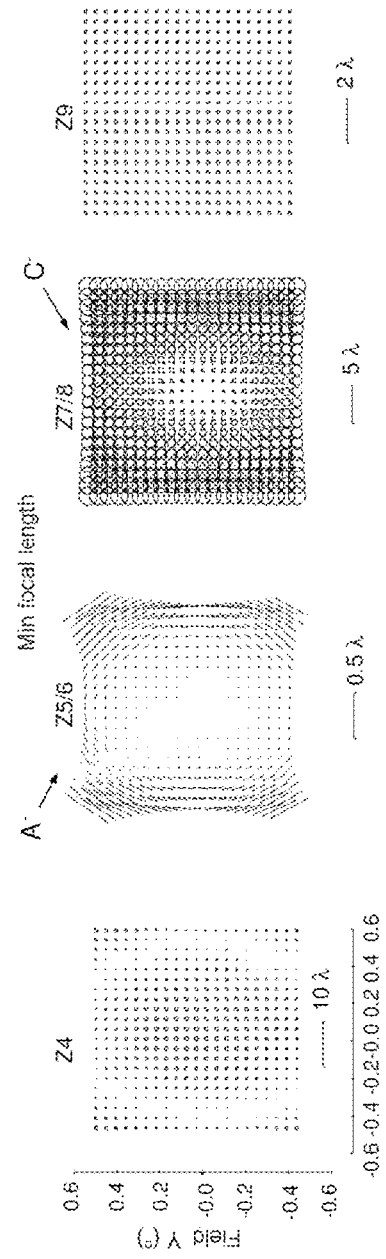

FIGS. 5a and 5b illustrate the aberrations present in the focal plane $P_F$ (positon of the detector) for a two-focal-length telescope of which the three aspherical mirrors M1, M2 and M3 of which have initial parameters obtained by solving the Korsch equations in the way explained above.

FIG. 5a illustrates the aberrations for the maximum focal length fmax, and FIG. 5b for the minimum focal length fmin.

It will be recalled that defocus corresponds to Z4, astigmatism to Z5 and Z6 (Z5/6), coma to Z7 and Z8 (Z7/8) and spherical aberration (of the first order) to Z9.

Figure 6:
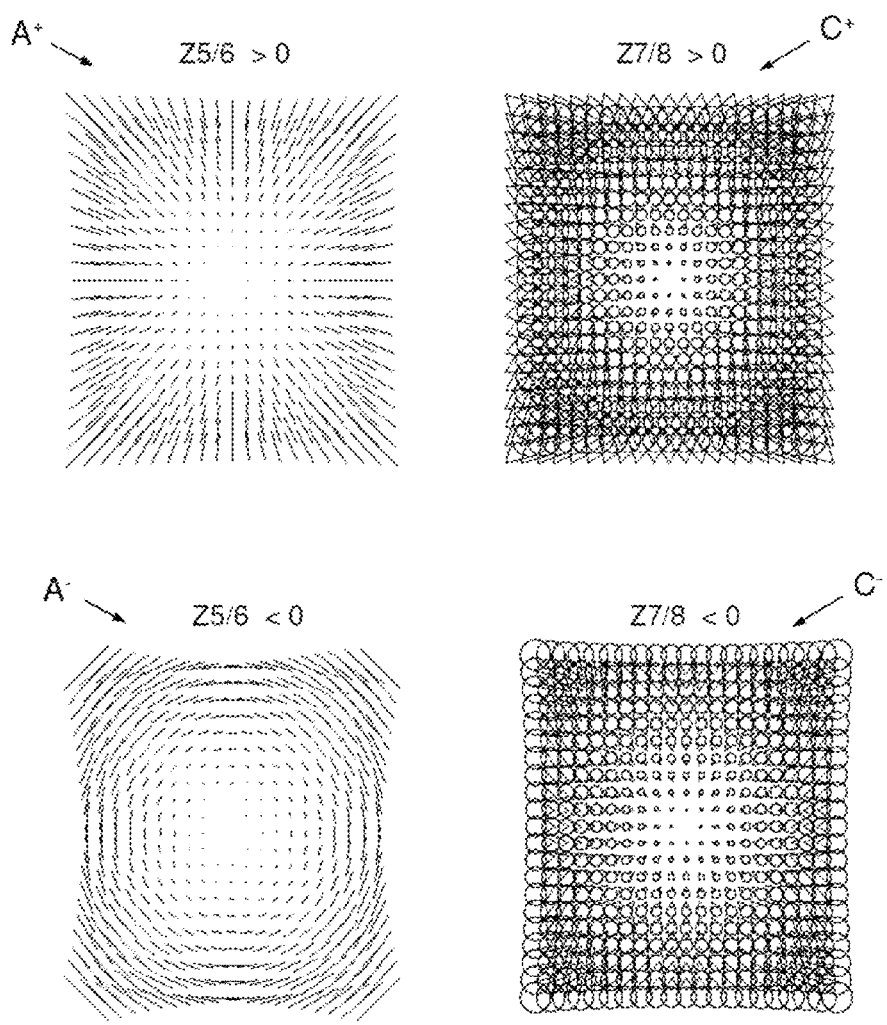
FIG. 6 illustrates the sign convention used for certain categories of aberrations.

In order to more precisely characterize the various categories of aberrations studied, we will adopt the sign convention illustrated in FIG. 6.

We will denote:
"radial" astigmatism: astigmatism for which the tangential focal point is located before the sagittal focal point. Below, this astigmatism will be considered by convention to be positive and will be denoted $A^+$;
"tangential" astigmatism: astigmatism for which the sagittal focal point is located before the tangential focal point. Below, this astigmatism will be considered by convention to be negative and will be denoted $A^-$;
"external" coma: coma for which the shape of the image spot of a point source is a "comet" the tail (i.e. the widest portion) of which is directed away from the optical axis. It is a question of the coma created by a bifocal lens. Below, this coma will be considered by convention to be positive and will be denoted $C^+$;
"internal" coma: coma for which the shape of the image spot of a point source is a "comet" the tail of which is directed toward the optical axis. Below, this coma will be considered by convention to be negative and will be denoted $C^-$.

It may be seen in FIGS. 5a and 5b that these aberrations, with the exception of spherical aberration Z9, are variable in the (X, Y) field of the telescope. The dominant aberrations for this initial configuration of the telescope are:

Dominant initial aberrations for the maximum focal length (FIG. 5a):
The astigmatism (Z5/6)>0 denoted $A^+$, and the coma (Z7/8)>0 denoted $C^+$.
Dominant initial aberrations for the minimum focal length (FIG. 5b):
The astigmatism (Z5/6)<0 denoted $A^-$, and the coma (Z7/8)<0 denoted $C^-$.
The telescope cannot be used in this state because the aberrations are too great.

Figure 7:
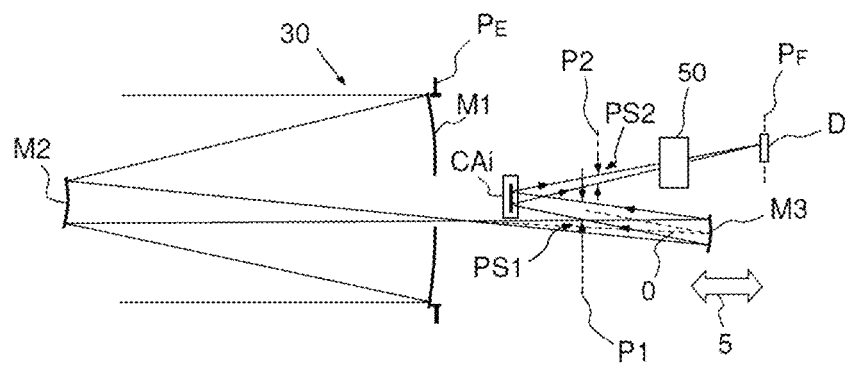
FIG. 7 schematically shows a Korsch telescope according to the invention.

The Korsch telescope 30 according to the invention that is illustrated in FIG. 7 is based on a telescope 20, such as illustrated in FIGS. 2 to 4, comprising three mirrors M1, M2 and M3 such as described above, and a first detector D placed in a first focal plane $P_F$ (the first detector and the first focal plane are denoted D and $P_F$ respectively because a second detector and a second focal plane will be introduced further on in a variant of the invention).

The telescope 30 according to the invention furthermore comprises a plurality of aspherical optical components CAi (i index comprised between 1 and n) respectively associated with the plurality of focal lengths fi, and respectively placed in a plurality of positions PCAi located between the first position P1 of the exit pupil PS1 and the second position P2 of the exit pupil PS2. It is between these two positions that the size of the aspherical components is minimized. The role of these aspherical components is to compensate for the aberrations of the system, focal length by focal length, and the way in which they are calculated is described below.

Preferably, the respective positions of the aspherical components are separated from one another by 50 mm at most and preferably at most 20 mm. This makes the optimization calculations described below easier.

The telescope 30 may comprise a plurality of n focal lengths with n>2, or only two focal lengths fmin and fmax (bifocal telescope).

The telescope 30 furthermore comprises means 50 for changing the optical path, which means are placed between the aspherical components CAi and the first detector D and configured so that the first detector remains positioned in the first focal plane of the telescope. The means 50 are typically the means 10 described with reference to FIG. 4a, or the assembly [T1, T2, 10'] described with reference to FIGS. 4b and 4c, or an assembly comprising stationary mirrors and at least one retractable mirror, such as for example the assembly [M0esc, Mf', Mf''] described with reference to FIG. 4d.

Each aspherical component CAi is placed on an optical path of a beam corresponding to the associated focal length fi when the telescope is working at said associated focal length fi, and off the optical path associated with another focal length when the telescope is working at this other focal length. Thus, a given aspherical component $CAi_0$ is "seen" (reflects or is passed through) by the light beam passing through the telescope only when the telescope is working at the corresponding focal length $fi_0$.

To obtain this property, according to one preferred embodiment at least one aspherical component is retractable, via an ad hoc mechanism, so as to be placed on the optical path of the beam corresponding to said associated focal length when the telescope is working at this associated focal length, and off the optical path associated with this working focal length when the telescope is working at one of the other focal lengths.

Various combinations of aspherical components CAi and of means 50 are possible to obtain the aforementioned property.

Figure 8:
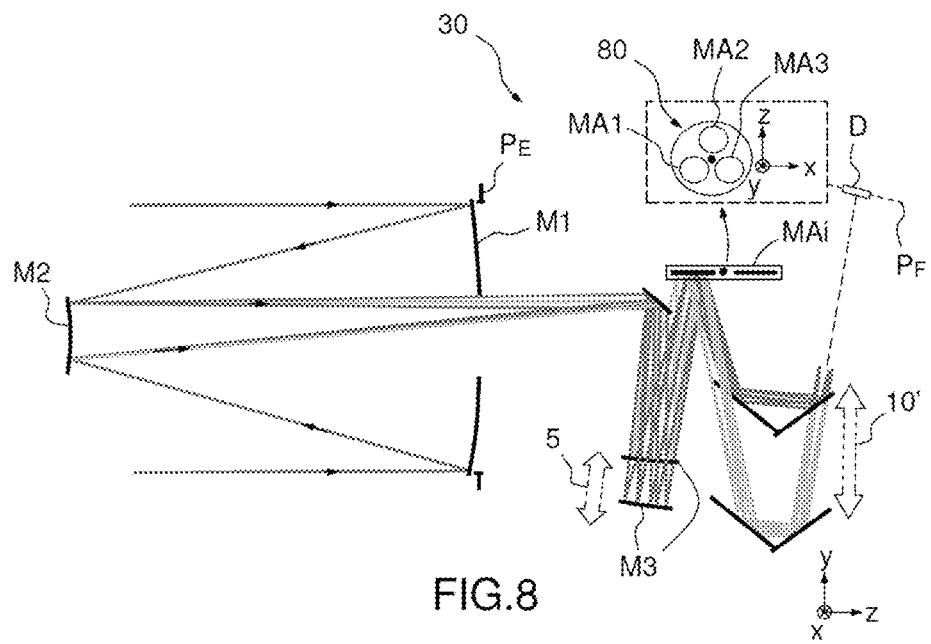
FIG. 8 illustrates a first variant of the telescope according to the invention, in which all the aspherical components CAi are retractable aspherical mirrors.

According to a first variant, the aspherical components CAi are all retractable aspherical mirrors MAi, such as illustrated in FIG. 8. They are placed on the optical path common to all the focal lengths, and positioned or not on the optical path depending on the focal length used. Typically, the simplest solution in terms of manufacture and control is for all of the retractable mirrors to be mounted on a single moving mechanism 80. In this case, the positions of the retractable mirrors PCAi are then substantially identical, to within 10 mm, or even 5 mm.

For a number of focal lengths at least equal to 3, an example mechanism is a bush wheel, such as illustrated in FIG. 8. The means 50 allowing the first detector D to be positioned in the first focal plane $P_F$ are for example roof-shaped mirrors with a translating mechanism 10' such as described with reference to FIGS. 4b and 4c.

Figure 9:
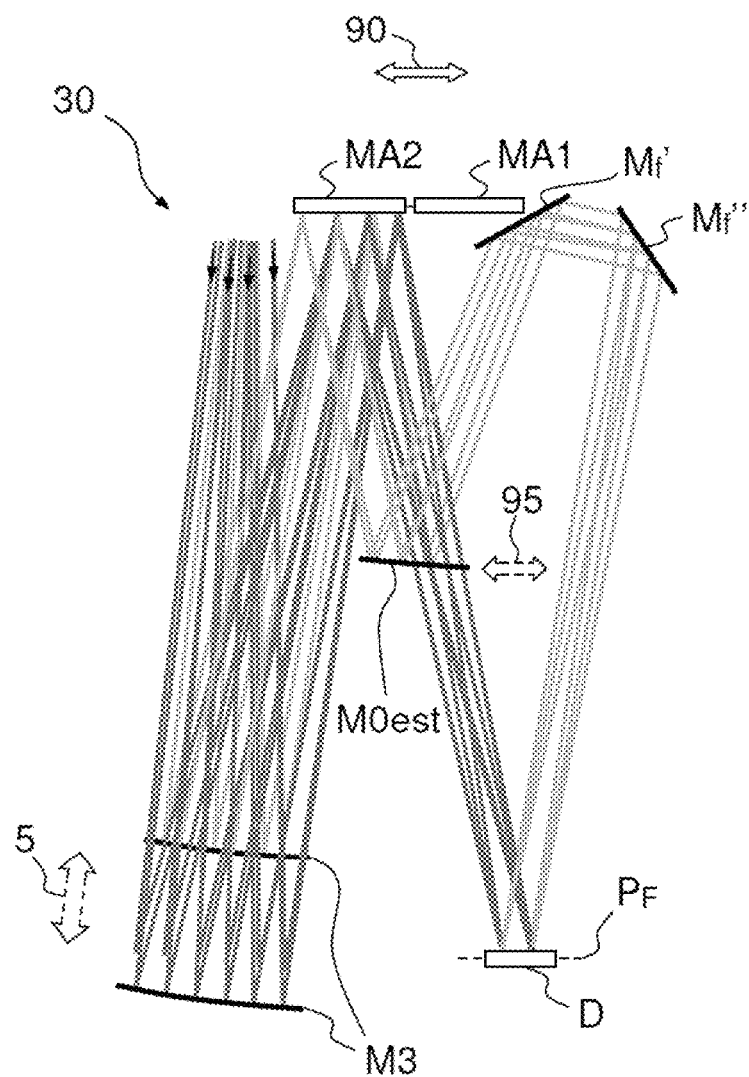
FIG. 9 illustrates an example of a two-focal-length telescope according to the first variant of the invention.

For a two-focal-length telescope, it is possible to use a translating mechanism 90 to position MA1 or MA2 on the optical-beam path common to the two focal lengths, such as illustrated in FIG. 9. When the telescope 30 is working with the long focal length fmax (dark grey), the retractable mirror M0esc is positioned on the optical path, the stationary mirrors Mf' and Mf" redirecting the beam to the first detector D, as described with reference to FIG. 4d and FIG. 9. When the telescope is working with the focal length fmin (light grey), the mirror M0esc is retracted with a mechanism 95. The complex mechanism for moving the roof-shaped mirrors is thus avoided.

For a two-focal-length telescope comprising two retractable aspherical mirrors MA1 and MA2, it is also possible to use a holder 80 with which the switch from one aspherical mirror to the other is achieved by flipping about an axis of rotation, i.e. what is referred to as a "flip/flop" mechanism.

The advantage of this first variant telescope 30 composed uniquely of mirrors is that its operation is independent of wavelength since the mirrors do not produce chromatic aberration. The spectral band of operation is then set by the nature of the reflective material of the mirrors and the spectral band of sensitivity of the first detector.

Figure 10:
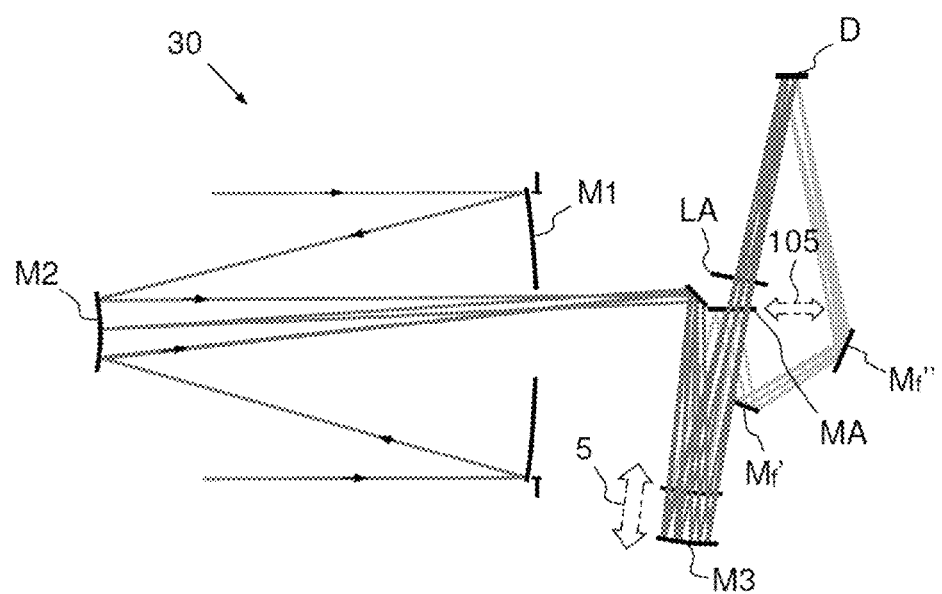
FIG. 10 illustrates a second variant of the telescope according to the invention in which at least one aspherical component is a plate working in transmission.

According to a second variant, at least one aspherical component is an aspherical plate LA working in transmission. An example for a two-focal-length telescope is illustrated in FIG. 10. The retractable aspherical mirror MA is positioned on the path of the beams when the telescope is working at the focal length fmax, and is retracted (via a mechanism 105) when the telescope is working at the focal length fmin, the aspherical plate LA then being located on the path of the beam. The moving mechanism 95 is thus no longer needed and can be omitted.

In the case of a telescope 30 according to the invention, the exit pupil does not remain stationary and depends on the focal length of the zoom. The exit pupil moves (order of magnitude ~200 mm) depending on the chosen focal length. The aspherical mirrors CAi therefore work in the field. This has a very large impact on the aberrations introduced into the system by the aspherical mirrors.

For a mirror placed at the exit pupil, a beam corresponding to a point of the field illuminates this mirror in its entirety, and therefore the reflected beam will be impacted by spherical aberration if the mirror in question has spherical aberration.

For a mirror positioned away from the exit pupil, each beam corresponding to a point of the field illuminates different zones of the mirror (not the entirety thereof). The wavefronts reflected by the different zones of the mirror will therefore have different aberrations. For example, as explained below, introducing spherical aberration into the CAi the positions of which do not coincide with the exit pupil, introduces, into the telescope, astigmatism and coma in much larger proportions than spherical aberration.

Let us now study which aberrations are able to be corrected by an aspherical component placed in the interpupil zone, i.e. between PS1 and PS2, in the initial telescope optimized with the Korsch equations.

In what follows it is necessary not to confuse aberrations due to the telescope, i.e. corresponding to defects in the telescope considered as an optical system, and aberrations introduced via the form of the aspherical component, which are denoted with the index CA.

The analysis that follows uses, by way of example, mirrors by way of aspherical components, but the calculations may easily be adapted to the use of at least one plate instead of a mirror.

FIG. 11 illustrates, for the initial system, the aberrations that result following the introduction of spherical aberration $Z9_{CA}$ into an aspherical component ($Z9_{CA}>0$ in FIG. 11a and $Z9_{CA}<0$ in FIG. 11b) as a function of its relative position with respect to the effective exit pupil PS, when it is located downstream of PS with respect to the mirror M3.

FIGS. 12a and 12b illustrate, for the initial system, the aberrations that result following the introduction of spherical aberration $Z9_{CA}$ into an aspherical component (with $Z9_{CA}>0$ in FIG. 12a and $Z9_{CA}<0$ in FIG. 12b) as a function of its relative position with respect to the effective exit pupil PS, when it is located upstream of PS with respect to the mirror M3.

The aspherical component being placed between P1 and P2, it is located as shown in FIGS. 11a and 11b for the max focal length (downstream of PS2 with respect to M3) and as shown in FIGS. 12a and 12b for the min focal length (upstream of PS1 with respect to M3).

It may be seen from FIGS. 11a-11b and 12a-12b that the introduction of spherical aberration $Z9_{CA}$ into an aspherical component CA introduces aberrations such as astigmatism and coma into the telescope. This means that an aspherical component may compensate for aberrations that are the inverse of those created by $Z9_{CA}$.

From FIGS. 11a and 11b it may be deduced that for the max focal length fmax:
introducing $Z9_{CA}>0$ creates astigmatism<0 and coma<0, this allowing astigmatism>0 and coma>0 to be corrected
introducing $Z9_{CA}<0$ creates astigmatism>0 and coma>0, this allowing astigmatism<0 and coma<0 to be corrected.

From FIGS. 12a and 12b it may be deduced that for the min focal length fmin:
introducing $Z9_{CA}>0$ creates astigmatism<0 and coma>0, this allowing astigmatism>0 and coma<0 to be corrected
introducing $Z9_{CA}<0$ creates astigmatism>0 and coma<0, this allowing astigmatism<0 and coma>0 to be corrected.

Thus, by placing one aspherical component per focal length between P1 and P2, $Z9_{CA}$ of a given sign allows, for the two extreme focal lengths, astigmatisms of the same given sign and comas of opposite sign to be simultaneously corrected.

For example, $Z9_{CA}>0$ allows $A^+$ and C to be corrected for fmax and $A^+$ and $C^-$ to be corrected for fmin.

This correctional capacity is incompatible with the initial system the aberrations to be corrected of which are illustrated in FIGS. 5a and 5b.

Thus, by applying, to the two-focal-length telescope, a conventional method for optimizing its parameters using the Korsch equations (initial configuration of the 3-mirror telescope) and by attempting to compensate for aberrations using an aspherical component, a dead end is reached: It is not possible by placing in the interpupil zone one component CA per focal length to simultaneously correct the astigmatism and coma present, in the working system, at the minimum focal length and the maximum focal length.

After much work, the inventors have identified a way of producing a Korsch telescope having a plurality of focal lengths and providing a very good image quality.

In the telescope 30 according to the invention, the third mirror M3 has a new conicity c'3 determined from the initial conicity c3 (calculated from the Korsch equations in the first optimization in the way explained above).

The new conicity c'3 is determined so that the three-aspherical-mirror anastigmat telescope has, in the absence of an aspherical component, and for the minimum and maximum focal lengths, aberrations that are compensable by addition of this aspherical component.

According to one embodiment, the compensable aberrations are astigmatism and coma. In light of the teaching of FIGS. 11 and 12, it is sought to obtain a M1/M2/M3 telescope configuration (without CAi) having the following compensable aberrations:

For the maximum focal length: positive astigmatism $A^+$ and positive coma $C^+$.

For the minimum focal length: positive astigmatism $A^+$ and negative coma $C^-$.

In FIGS. 5a and 5b, it may be seen that the astigmatism for the minimum focal length is negative.

The new conicity c'3 is therefore determined so as to modify the sign of the telescope astigmatism in the absence of an aspherical component, for the minimum focal length, i.e. so as to convert the negative astigmatism of the system into a positive astigmatism for the minimum focal length.

Figure 13:
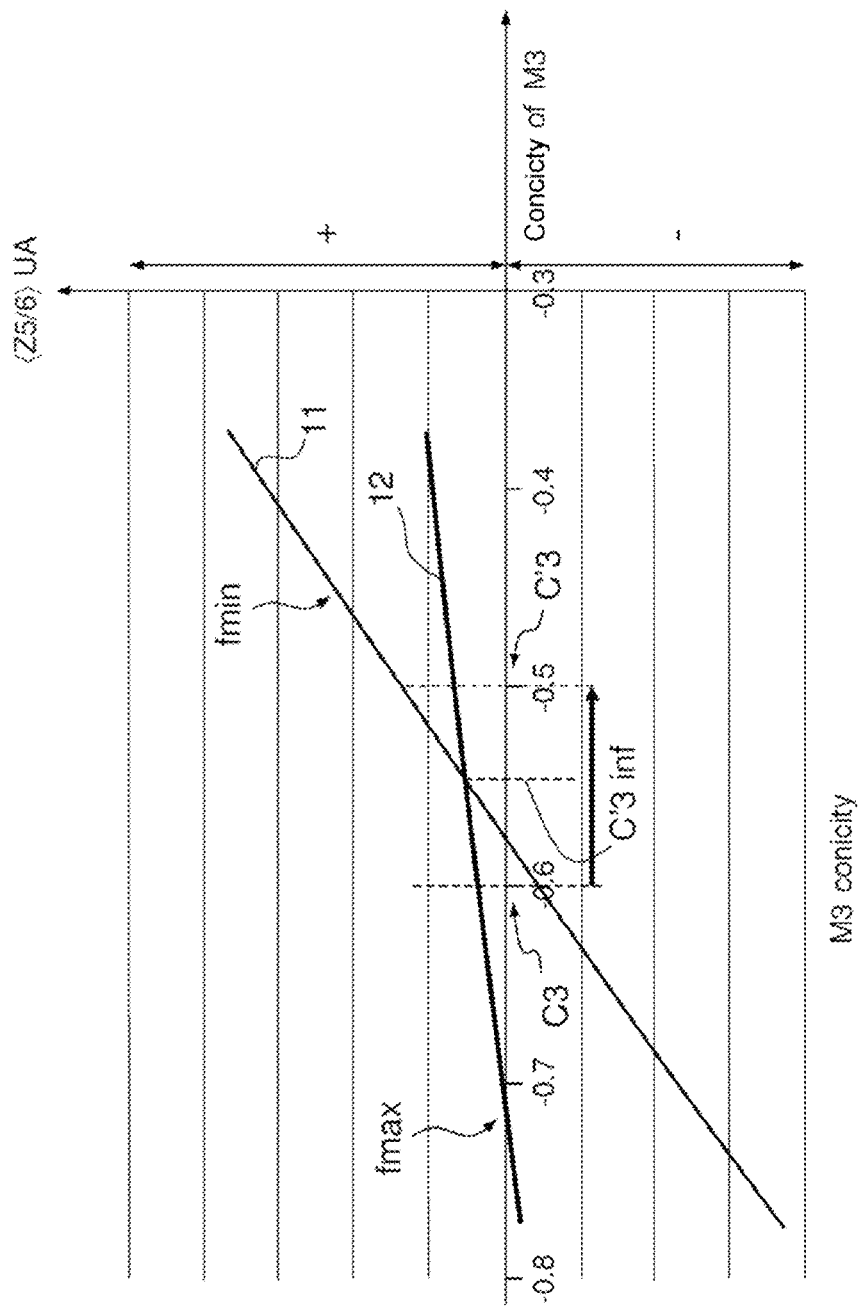
FIG. 13 illustrates the variation in the average value of the astigmatism of the telescope as a function of the conicity value of M3.

FIG. 13 illustrates the variation in the average value of the <Z5/6> astigmatism of the 3-mirror telescope (without the CAi) in arbitrary units, for the min focal length (curve 11) and max focal length (curve 12), as a function of the conicity value of M3. With the initial conicity c3=-0.61, the astigmatism is positive for fmax and negative for fmin.

This figure demonstrates the existence of a value of c'3inf at which the sign of the astigmatism at the min focal length inverts, here c'3inf=-0.56. For a new conicity c'3 higher than or equal to c'3inf, the astigmatism of the min focal length changes sign. Furthermore, the new value of c'3 cannot be too greatly different from the initial value c3 in order to maintain the convergence of the optical system.

A second optimization of image quality is then carried out, starting with the value c'3inf, in order to determine the new conicity c'3, the position PCAi of each CAi and the form of each surface Si that allows the best image quality to be obtained according to the preset criterion.

Preferably, when all the aspherical components are mirrors, they are considered to be positioned in the same place, i.e. all the PCAi are considered to be equal to a single position Pm, this simplifying the optimization. Next, S1 is calculated for fmin and Sn for fmax, and the intermediate Si are deduced from S1 and S2.

According to another embodiment, PCA1 and S1 and PCAn and Sn are calculated first and intermediate PCAi and Si are deduced from these values.

Given that the aberrations able to be compensated for by an aspherical component are already known (see FIGS. 11 and 12) it is known that the form of the surface Si of a CAi suitable for compensating for the aberrations of the optical system of focal length fi comprising M1, M2, and M3 of conicity c'3, must comprise first-order spherical aberration $Z9_{CA}$ and more particularly positive $Z9_{CA}$.

Thus, the exact value of the new conicity c'3, the positions PCAi and where appropriate the median position Pm of the CAi, and the forms S1 for fmin, Sn for fmax, and Si for fi, are determined via a second optimization of the optical paths in the instrument, so as to correct the aberrations of the 3-mirror telescope having a new conicity c'3 and to optimize image quality in the first focal plane of the telescope according to the preset criterion, typically the minimization of a wavefront error WFE.

The modification of the conicity of M3 makes it possible to invert the sign of the astigmatism at the min focal length, and thus to introduce aberrations into the optical system such that the aberrations resulting from the optical system may be compensated for by an aspherical component positioned in the interpupil zone.

Figure 14A:
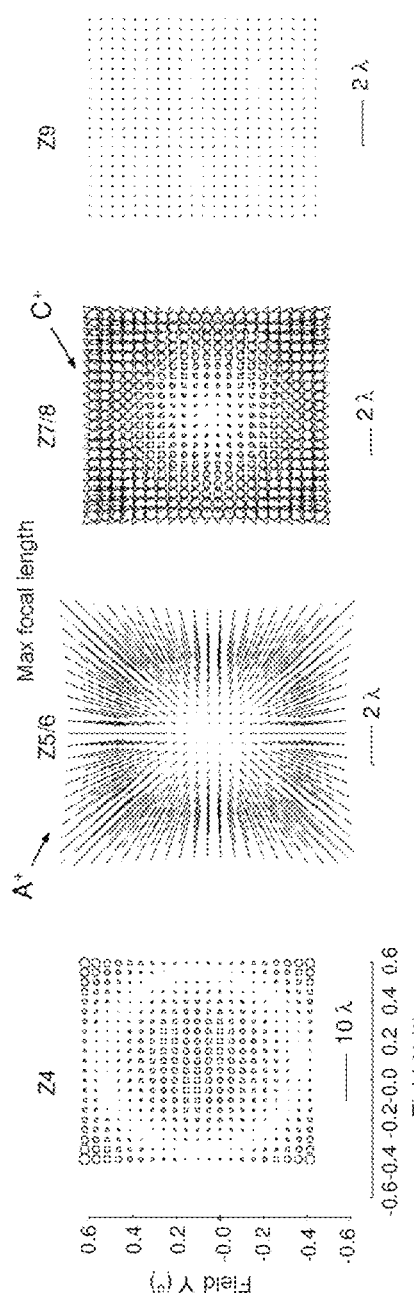
FIGS. 14a and 14b illustrate the various aberrations present in the first focal plane of the telescope, with M3 having a conicity c'3=−0.52, FIG. 14a for the max focal length and FIG. 14b for the min focal length.
Figure 14B:
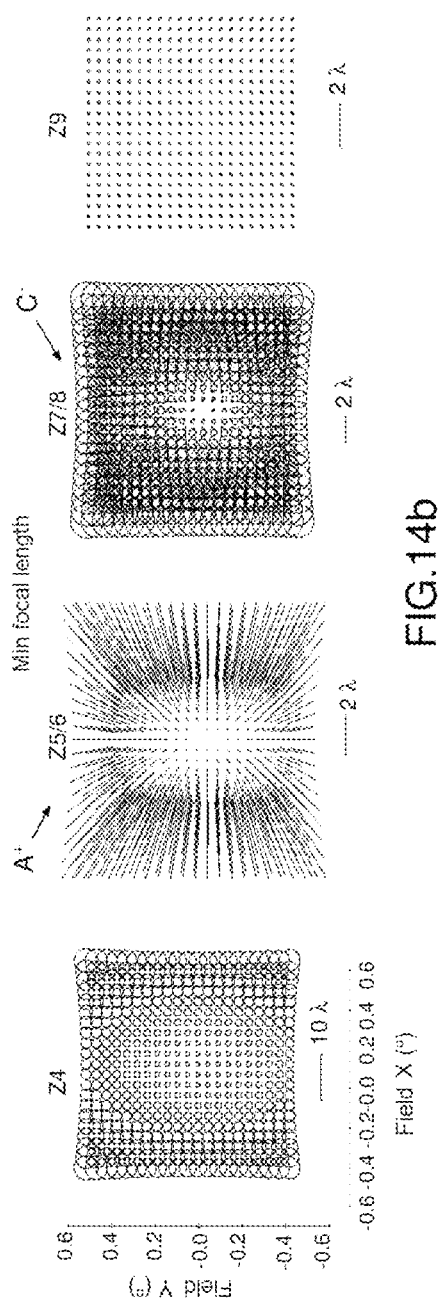

FIGS. 14a and 14b illustrate the various aberrations present in the first focal plane of the 3-mirror telescope the M3 of which has the new conicity c'3=-0.52.

The new value c'3 of the conicity of M3 allows positive astigmatisms to be obtained for all the focal lengths and comas of opposite sign to be obtained for the extreme focal lengths.

In the example, the new conicity c'3 differs by about 20% from the initial conicity c3 (equal to -0.61). Preferably, the new conicity c'3 differs from the initial conicity c3 by more than 5% and by less than 30%.

Figure 15:
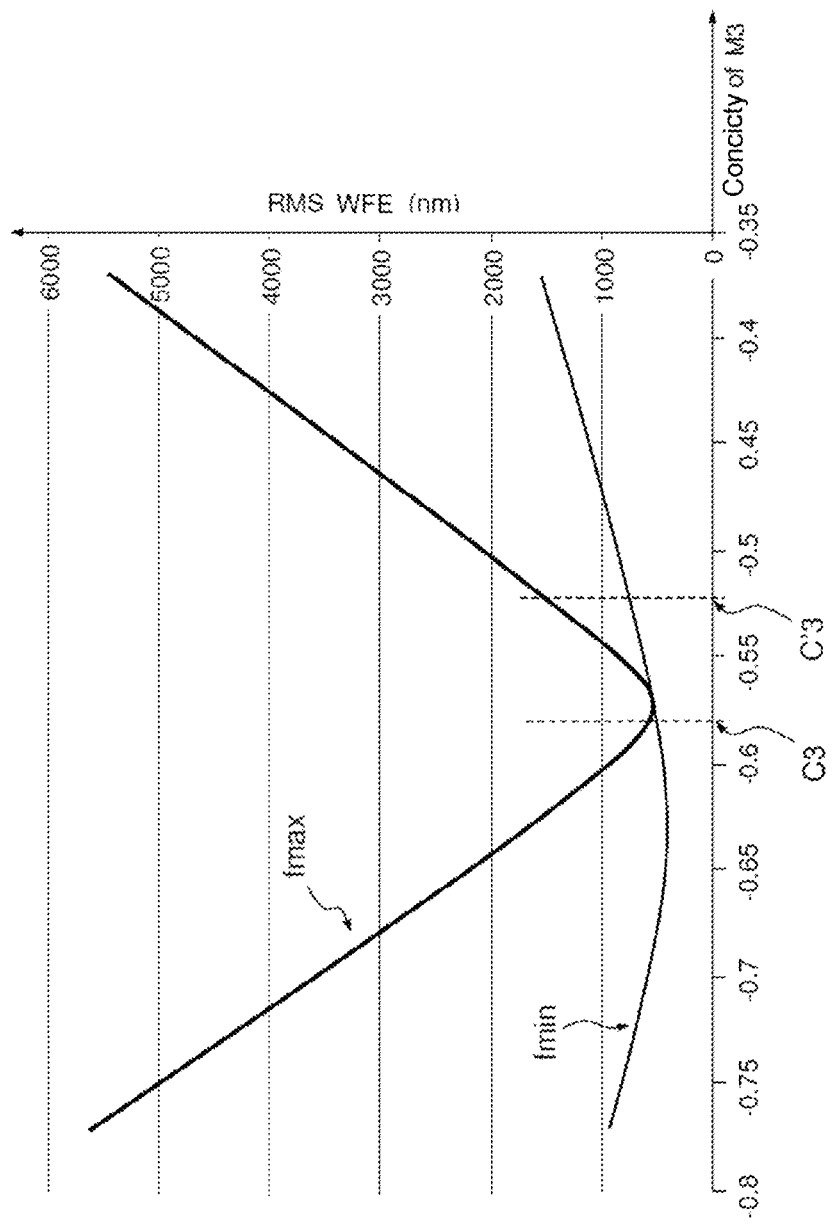
FIG. 15 illustrates the variation in the root-mean-square value of the wavefront error RMS WFE as a function of the conicity value of M3.

FIG. 15 illustrates the variation in the root-mean-square value of the wavefront error RMS WFE as a function of the conicity value of M3, for the min focal length (curve 15) and the max focal length (curve 16). It may be seen that the initial conicity c3 corresponded to the optimized value of image quality, a new conicity value c'3 higher than -0.56 leading to an increase in WFE, i.e. to a decrease in image quality. The change in value of the conicity of M3 is not in response to a need for image quality, but allows aberrations that are compensable by a CA to be obtained. Image quality is no longer optimum with the aim of allowing aberrations to be corrected.

Figure 17:
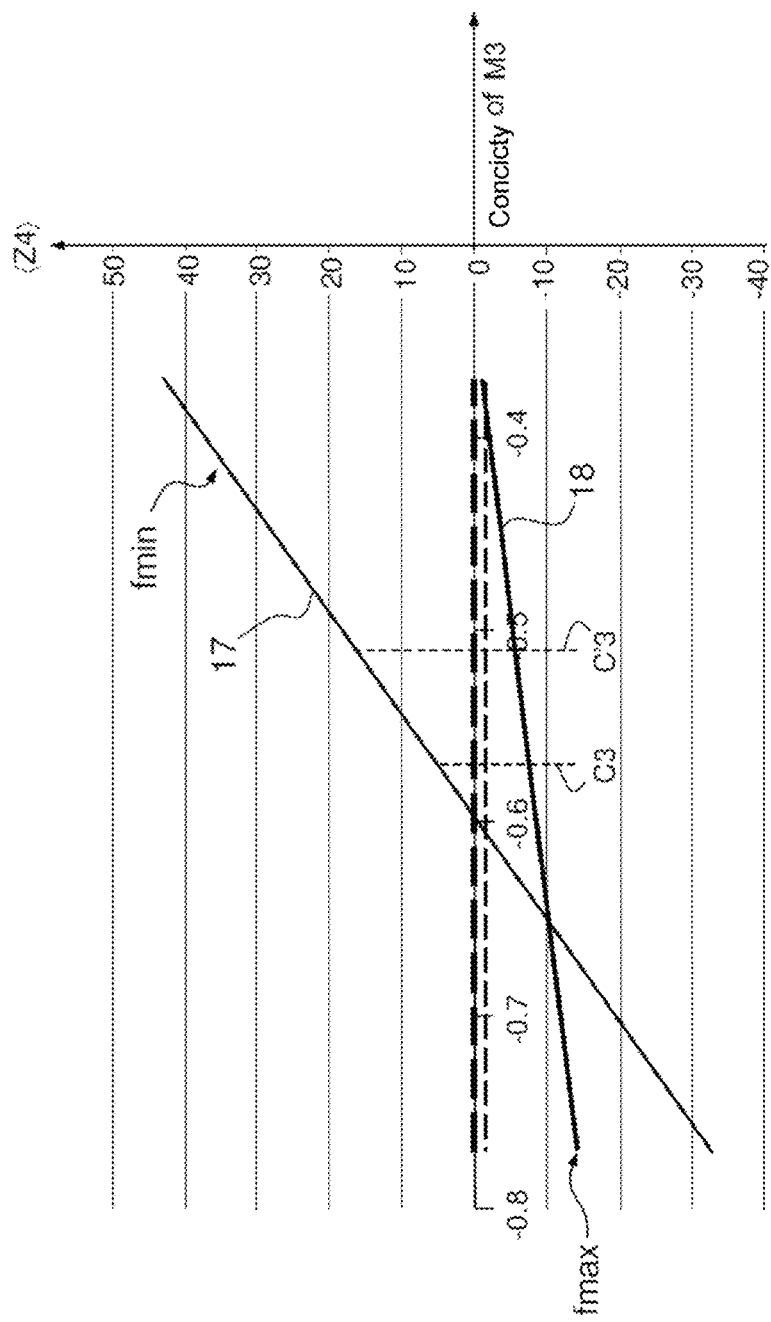
FIG. 17 illustrates the variation in the average defocus <Z4> of the 3-mirror telescope without the aspherical components as a function of the value of the conicity of M3.

Introducing spherical aberration $Z9_{CA}$ with each aspherical component CAi allows the Z7/8 (coma) and Z5/6 (astigmatism) of the system to be greatly decreased, but does not decrease defocus Z4. On the contrary, $Z9_{CA}$ will also lead to an increase in the Z4 of the telescope as illustrated in FIG. 17, which illustrates the variation in the average defocus <Z4> of the system (3-mirror telescope without CAi) as a function of the value of the conicity of M3, for the min focal length (curve 17) and the max focal length (curve 18): it may be seen that defocus Z4 increases substantially, in particular for the min focal length.

It is recommended to introduce defocus $Z4_{CA}$ into the form of each CAi in order to compensate for the Z4 of the system (that initially present and that introduced by $Z9_{CA}$).

The introduction of $Z4_{CA}$ also allows the coma and astigmatism values to be balanced, i.e. to bring the values of the respective coefficients close together, thereby allowing the compensation by the $Z9_{CA}$ to be improved.

On the basis of the range identified for c'3, the final value of c'3, the final $Z9_{CA}(i)$ and the final $Z4_{CA(i)}$ to be used for S1, Sn and all the intermediate Si, and the various positions (or the single position Pm) of the CAi are determined via a second optimization.

FIGS. 16a and 16b illustrate the various aberrations in the first focal plane of a telescope 30 according to the invention, the mirror M3 of the telescope having a new conicity c'3 and the CAi having a single median position Pm and optimized values of $Z9_{CA}(1)$ and $Z9_{CA}(n)$ and of $Z4_{CA}(1)$ and $Z4_{CA}(n)$ (namely $Z9_{CA/max}$ and $Z9_{CA/min}$; $Z4_{CAmax}$ and $Z4_{CA/min}$). FIG. 16a illustrates the various aberrations for the max focal length and FIG. 16b for the min focal length.

The form of the surface Sn for the max focal length therefore comprises $Z9_{CA}(n)$ and $Z4_{CA}(n)$. The form of the surface S1 for the min focal length therefore comprises $Z9_{CA}(1)$ and $Z4_{CA}(1)$.

With the example c'3=−0.52, the CAi are all positioned 110 mm after PS1 and 140 mm before PS2.

It may be seen by comparing FIGS. 16a and 16b with FIGS. 5a and 5b (note the change of scale) that the quality of the telescope is greatly improved.

According to one embodiment, to further improve image quality, the conicities of the mirrors M2 and M1 of the telescope 30 according to the invention are modified slightly.

In our example, the performance of the telescope may be further improved, the Z7/8 and Z9 being compensated for only by the $Z9_{CA}$.

Modifying the conicity of M2 (new c'2 value) allows exactly these two aberrations to be adjusted. However, this new conicity c'2 also introduces a large amount of Z4. This excess of Z4 is counterbalanced by modifying the conicity of M1 (new c'1 value), which also modifies the Z9.

Thus, a new conicity c'1 is determined for the first mirror and a new conicity c'2 is determined for the second mirror from a first initial conicity c1 of the first mirror and a second initial conicity c2 of the second mirror, respectively, so as to further improve the image quality of the telescope according to the preset criterion.

Figure 18:
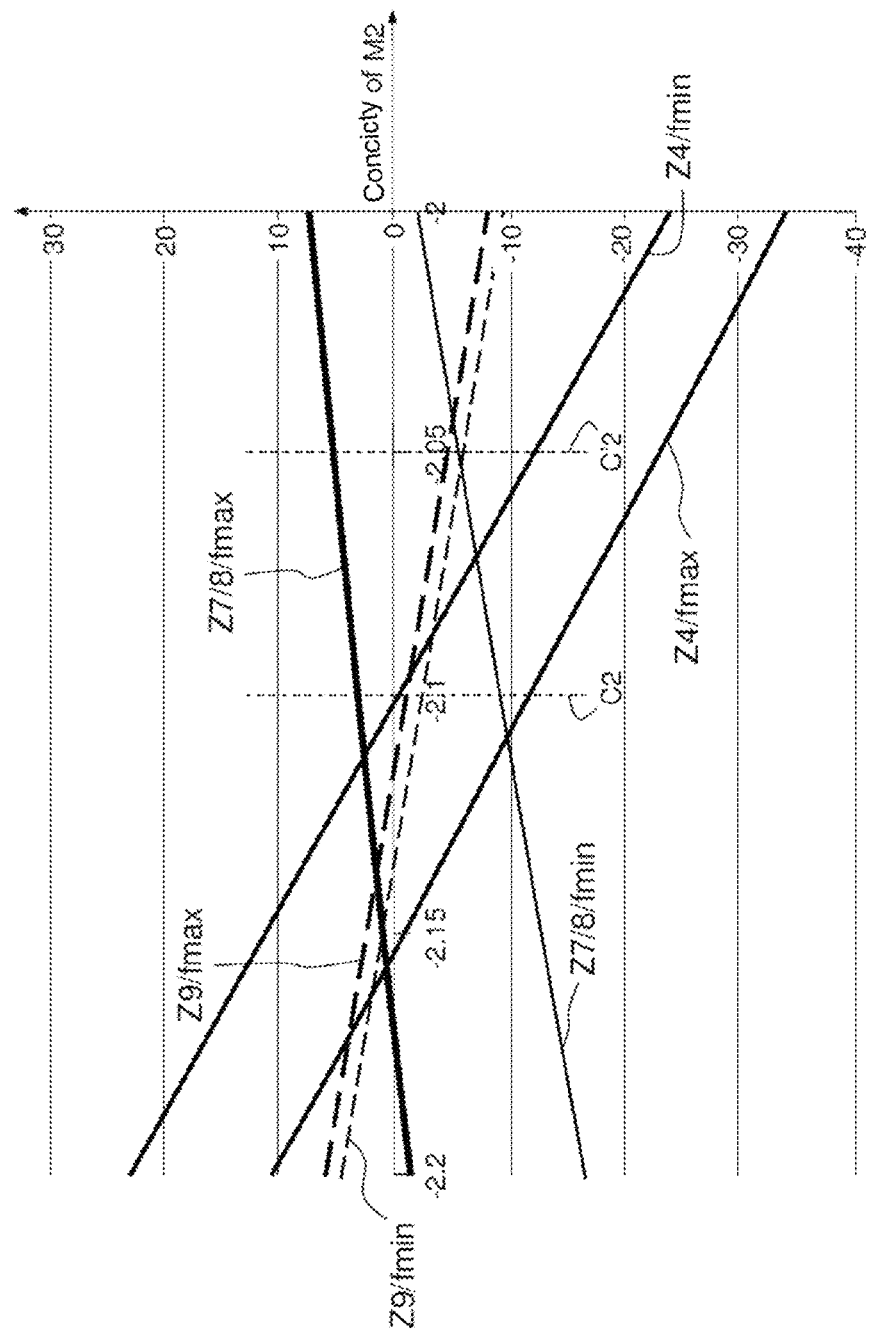
FIG. 18 illustrates the variation in the main aberrations as a function of the value of the conicity of M2, for the min and max focal lengths.
Figure 19:
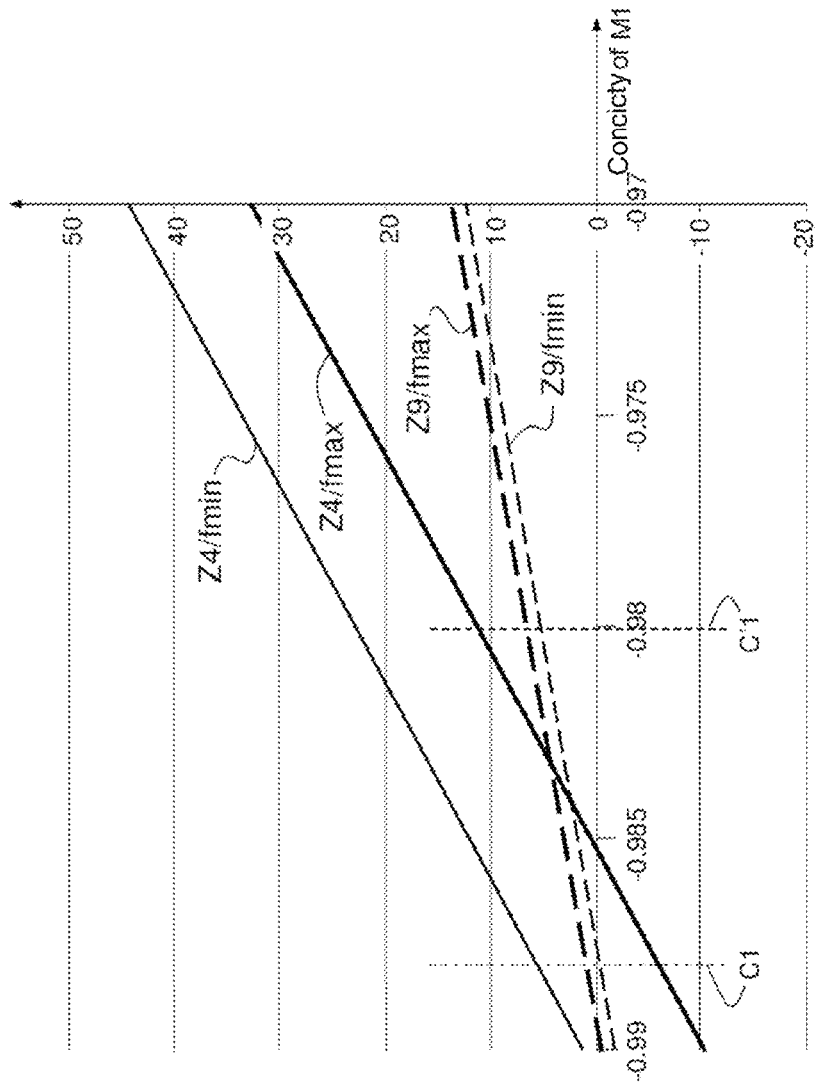
FIG. 19 illustrates the variation in the main aberrations as a function of the value of the conicity of M1, for the min and max focal lengths.

For example, these modifications are illustrated in FIGS. 18 and 19.

FIG. 18 illustrates the variation in the main aberrations as a function of the value of the conicity of M2, for the min and max focal lengths, and FIG. 19 the variation in the main aberrations as a function of the value of the conicity of M1.

As illustrated in FIGS. 18 and 19, a third optimization is used to determine the new conicity values c'2 and c'1:
c'1=−0.98
c'2=−2.1.

By comparing them to the initial values c1=−1 and c2=−2, it may be seen that these conicity variations are small (less than 10%, or even less than 5% for c1), but nevertheless allow image quality to be further improved.

As a variant, $Z16_{CA}$, i.e. second-order spherical aberration, which influences Z16, Z9, Z4 Z5/6 and Z7/8 and allows image quality to be further increased, is also added.

Figure 20A:
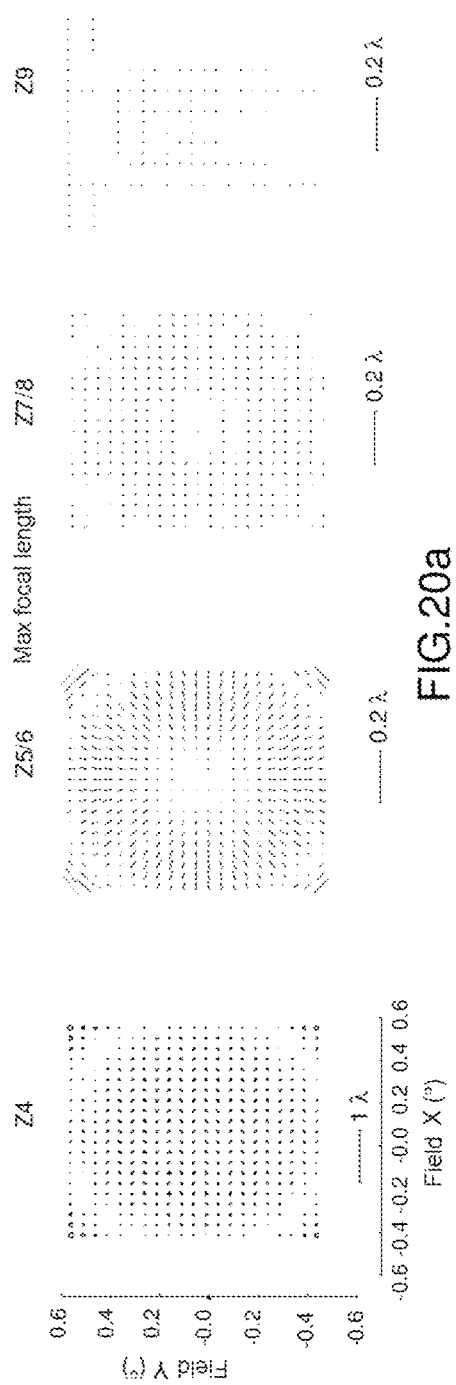
FIGS. 20a and 20b illustrate the various aberrations in the first focal plane of a telescope according to the invention, the mirrors M1, M2 and M3 of the telescope respectively having new conicities c'1, c'2 and c'3 and the mirror-type aspherical components of the telescope having an identical position Pm and optimized values of $Z9_{MD}$, of $Z4_{MD}$ and of $Z16_{MD}$.
Figure 20B:
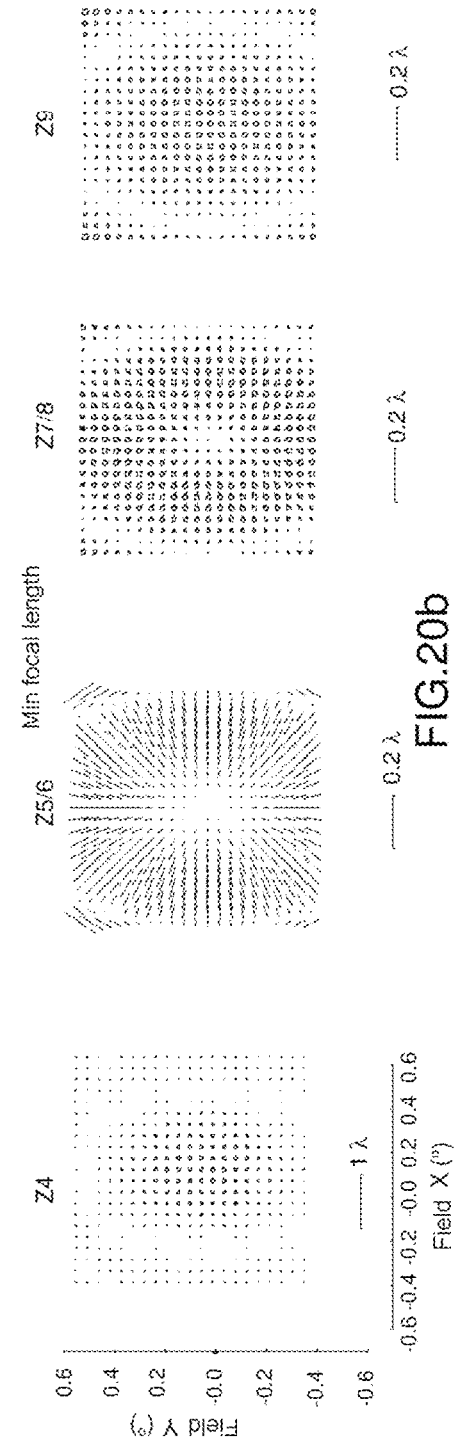

FIGS. 20a and 20b illustrate the various aberrations in the first focal plane of a telescope 30 according to the invention, the mirrors M1, M2 and M3 of the telescope respectively having new conicities c'1, c'2 and c'3 and CA1 and CAn having a median position Pm and optimized values of $Z9_{CA}$, $Z4_{CA}$ and $Z16_{CA}$. FIG. 20a illustrates the various aberrations for the max focal length and FIG. 20b for the min focal length.

It will be recalled that c'3=−0.52, c'1=−0.98 and c'2=−2.1.

Table 2 below gives the values of the parameters (R, k, A, B) and the equivalent Zernicke coefficients Z4, Z9 and Z16 allowing the surface Sn of the aspherical mirror MAn corresponding to fmax=37.5 m to be characterized.

TABLE 2

|   |   |   |   |   |
|---|---|---|---|---|
|   |   |   | Z4 | −2.89E−02 mm |
|   |   |   | Z5 | 0 |
|   |   |   | Z6 | 0 |
| R | −34500 |   | Z7 | 0 |
| k | 0 | = | Z8 | 0 |
| A | −3.43E−10 |   | Z9 | −7.21E−04 |
| B | 4.27E−15 |   | Z10 | 0 |
|   |   |   | Z11 | 0 |
|   |   |   | Z12 | 0 |
|   |   |   | Z13 | 0 |
|   |   |   | Z14 | 0 |
|   |   |   | Z15 | 0 |
|   |   |   | Z16 | 1.06E−05 |

Table 3 below gives the values of the parameters (R, k, A, B) and the equivalent Zernicke coefficients Z4, Z9 and Z16 allowing the surface S1 of the aspherical mirror MA1 corresponding to fmin=15 m to be characterized.

TABLE 3

|   |   |   |   |   |
|---|---|---|---|---|
|   |   |   | Z4 | −2.72E−02 |
|   |   |   | Z5 | 0 |
|   |   |   | Z6 | 0 |
| R | −46500 |   | Z7 | 0 |
| k | 0 | = | Z8 | 0 |
| A | −5.40E−10 |   | Z9 | −1.31E−03 |
| B | 1.67E−14 |   | Z10 | 0 |
|   |   |   | Z11 | 0 |
|   |   |   | Z12 | 0 |
|   |   |   | Z13 | 0 |
|   |   |   | Z14 | 0 |
|   |   |   | Z15 | 0 |
|   |   |   | Z16 | 6.50E−05 |

Each surface may be optimized via the parameters (R, k, A, B) or via the equivalent Zernicke coefficients Z4, Z9, Z16, depending on the chosen option of the software package used.

It is also possible to take the optimization further by including higher orders i.e. to refine the surface with parameters C, D, etc. or their equivalent in Zernicke coefficients.

It may be seen by comparing FIGS. 20a and 20b with FIGS. 16a and 16b (note the change of scale) that the quality of the telescope is greatly improved. The obtained final image quality is compatible with the constraint of an RMS WFE<λ/15, which in the visible corresponds to a RMS WFE<50 nm (see FIG. 22 below).

In the telescope 30 according to the invention, the aspherical components CAi form an integral part of the optics of the instrument.

Preferably, when the telescope according to the invention has a plurality of intermediate focal lengths with n>2, the form Si of each CAi associated with the intermediate focal lengths is calculated from the form of the surfaces S1 and Sn for the minimum a maximum focal lengths, respectively, in order to apply a suitable correction at each focal length.

Thus, once the aberrations $Z9_{CA}$, $Z4_{CA}$ and $Z16_{CA}$ have been optimized for fmin and fmax, i.e. once the values of the coefficients of the fringe Zernike polynomials have been determined for fmin and fmax, values are calculated for the polynomial coefficients for each intermediate focal length, from the values of the coefficients of the fringe Zernike polynomials determined for fmin and fmax.

Figure 21:
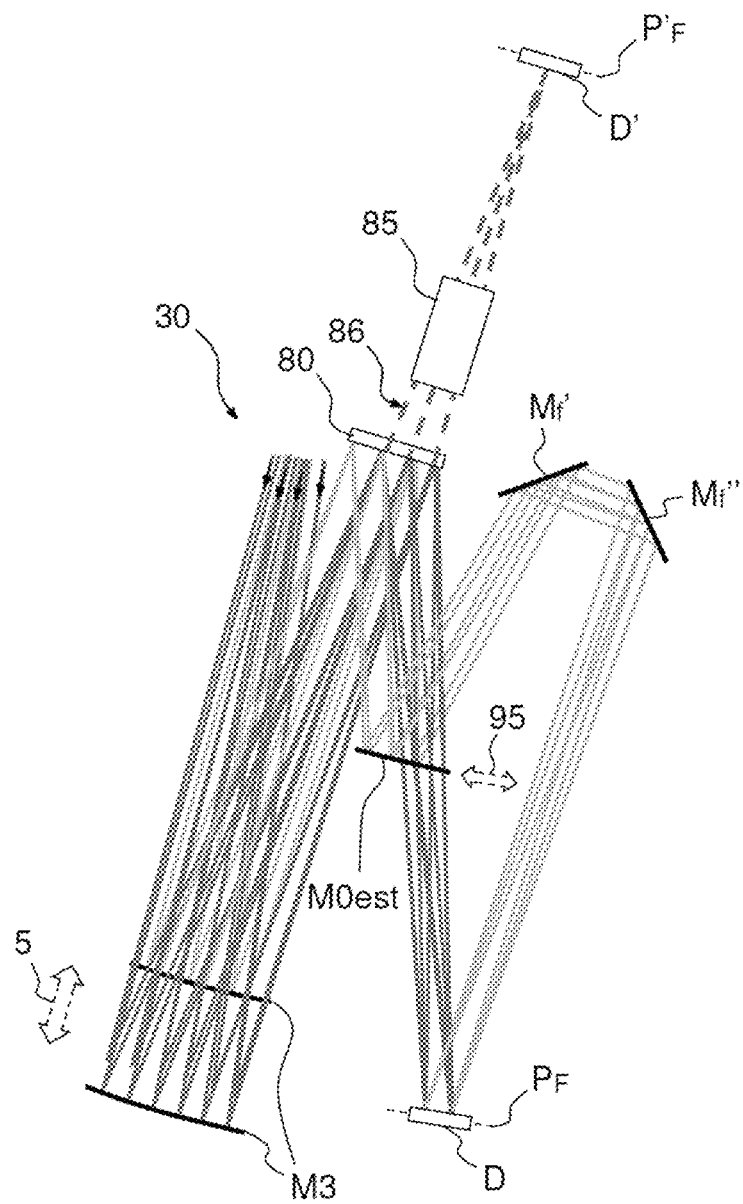
FIG. 21 illustrates a multichannel embodiment of the telescope according to the invention.

According to one embodiment, the telescope 30 according to the invention has an additional channel operating in a wavelength range that is different from the operating range of the main channel of the telescope, an example architecture of this type of telescope being illustrated in FIG. 21.

The main channel operates in a first wavelength range SB1, typically the visible between 400 and 800 nm, and the sensitivity of the first detector D is suitable for SB1. The additional channel operates in a second spectral band SB2 that is different from SB1, typically comprised in the infrared band.

In this embodiment, the aspherical components associated with the various focal lengths are preferably retractable mirrors MAi mounted on a single holder 80. This holder furthermore has a neutral position in which no retractable mirror features on the optical path of the optical beam incident on the holder (simple "hole" with no optical function). The beam then passes through the holder 80 on a secondary optical path 86.

Figure 22:
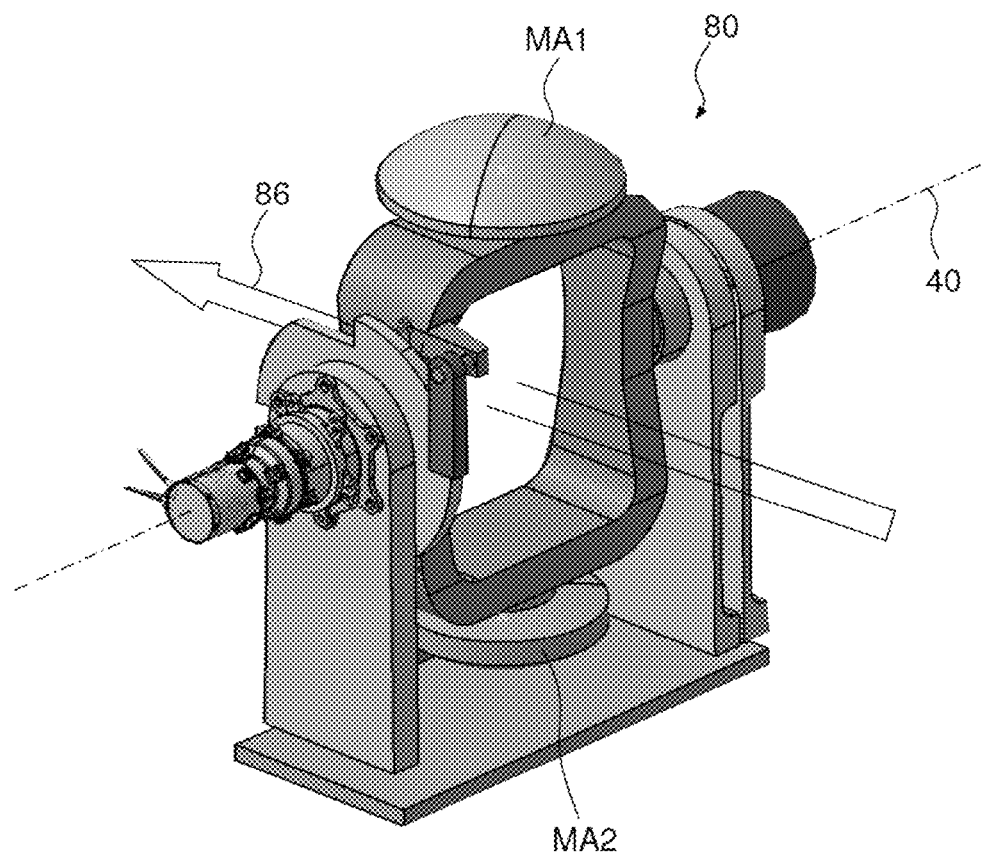
FIG. 22 illustrates a holder of aspherical mirrors that is suitable for the multichannel embodiment.

For a two-focal-length telescope, an example embodiment of such a three-position holder 80 is illustrated in FIG. 22. It has three positions, respectively obtained by pivoting around an axis of rotation 40, the two aspherical mirrors MA1 and MA2 being mounted around a hollow structure. In a first position MA1 reflects the incident beam, in a second position it is MA2 that reflects the incident beam, and in a neutral third position the incident beam passes through the holder. Other designs are of course possible, such as a bush wheel.

This multichannel telescope 30 furthermore comprises an optical device 85 placed on the secondary optical path 86 and configured to generate a second focal plane $P'_F$ of the telescope, corresponding to a chosen focal length f'. The optical device 85 preferably works in transmission, so as to be compatible with a focal length f' chosen to be very much smaller than fmin, typically 10 times smaller. The device 85 is furthermore configured to correct the compensable aberrations of the telescope and to optimize image quality in the second focal plane $P'_F$ of the telescope according to the preset criterion. It has the same compensating function as the aspherical mirrors. It is typically a dioptric objective composed of a plurality of lenses. Because of the flexibility of the design, the lenses may be spherical while having a compensating function.

A second detector D' is placed in the second focal plane $P'_F$ of the telescope, and is sensitive in the second spectral band SB2. A spectral filter is preferably placed on the secondary optical path, between the holder 80 and the second detector D' in order to select the spectral band SB2.

Thus, an additional channel is achieved without substantial mechanical complex location.

An example of an embodiment is a telescope having a two-focal-length main channel in the visible and a single-focal-length additional infrared channel. For optics carried on-board satellites, it is sought to obtain an infrared channel of lower resolution than the visible channel, but of larger field, this being obtained with a focal length f that is shorter, typically by a factor of 10, than fmin. For example, the focal length in the visible may be about ten meters and the IR focal length about one meter.

The position of the mirror M3 when operating in the infrared is preferably (but not necessarily) equal to one of the positions corresponding to the focal lengths of the visible main channel. At this focal length, a simultaneous visible/IR measurement is possible.

According to one variant, the telescope according to the invention includes an aperture diaphragm placed in the interpupil zone and the aperture of which may be adjusted in order to keep a numerical aperture substantially constant when focal length changes.

Figure 23:
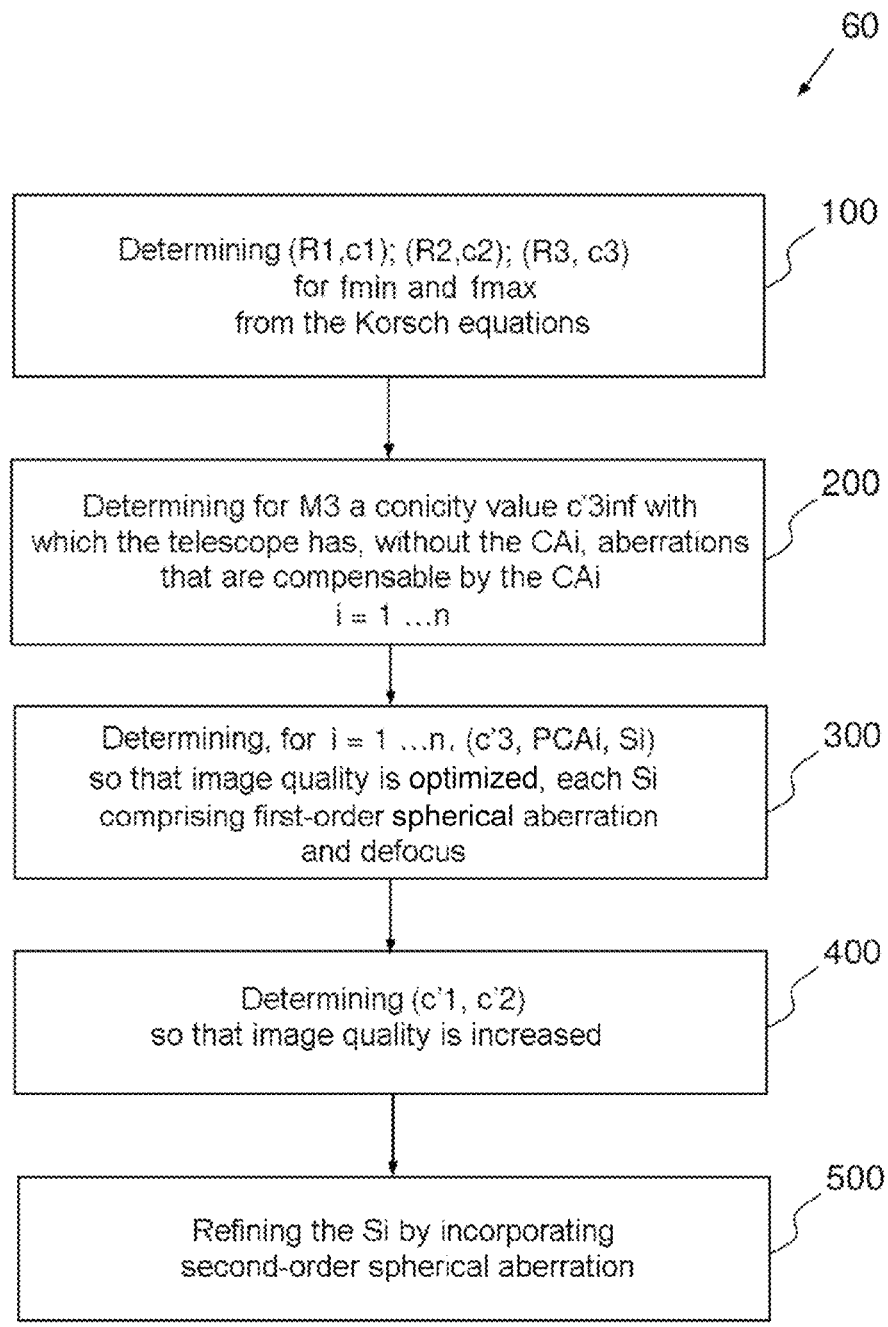
FIG. 23 illustrates the method for determining parameters of an anastigmat telescope according to the invention.

According to another aspect, the invention relates to a method 60 for determining parameters of an anastigmat telescope, which method is illustrated in FIG. 23.

The telescope comprises:
three aspherical mirrors, a concave first mirror M1, a convex second mirror M2, and a concave third mirror M3;
a first detector D;
a plurality of aspherical components CAi (i index from 1 to n); and
means 5 for moving the third mirror linearly along the optical axis O of the telescope so as to make the focal length of the telescope change to a plurality of focal lengths fi (i index from 1 to n) between a minimum focal length fmin and a maximum focal length fmax.

The three mirrors M1, M2 and M3 are arranged so that the first mirror and the second mirror form from an object at infinity an intermediate image between the second mirror and the third mirror, the third mirror forming from this intermediate image a final image in the first focal plane of the telescope in which the first detector D is placed.

The first, second and third mirrors are of a set form characterized by at least a conicity and a radius of curvature.

Furthermore, the telescope has at the minimum focal length a first exit pupil PS1 in a first position P1, and the telescope has at the maximum focal length a second exit pupil PS2 in a second position P2.

The plurality of aspherical components CAi are respectively associated with the plurality of focal lengths fi, each aspherical component being placed on an optical path of a beam corresponding to said associated focal length when the telescope is working at said associated focal length, and off the optical path associated with another focal length when the telescope is working at said other focal length.

The aspherical components are respectively placed in a plurality of positions PCAi located between the first and second position.

The method 60 comprises a first step 100 in which values, termed initial values, are determined for the conicities and radii of curvature of the first, second and third mirrors of the telescope:

M1 (c1, R1); M2 (c2, R2); M3 (c3, R3).

These initial values are compatible both with the minimum focal length fmin and the maximum focal length fmax, in the absence of aspherical components, and are determined from the Korsch equations, via a first optimization of the image quality in the first focal plane of the telescope according to a preset criterion.

In a second step 200, a conicity value c'3inf is determined for the third mirror, from the initial conicity c3 of the third mirror, with which value the telescope has, in the absence of aspherical components and at the minimum and maximum focal lengths, aberrations that are compensable by the aspherical components CA1 and CAn respectively associated with the focal lengths fmin and fmax.

Next, in a step 300, the following are determined via a second optimization: a new conicity value c'3 for the third mirror and the position PCAi and the form of the surface Si of each aspherical component CAi, so as to correct the compensable aberrations and to optimize the image quality in the first focal plane of the telescope according to the preset criterion. The form of each surface Si comprises at least first-order spherical aberration and defocus.

Preferably, the method 60 furthermore comprises a step 400 consisting in determining a new conicity c'1 for the first mirror and a new conicity c'2 for the second mirror M2, so as to further improve image quality according to the preset criterion.

Preferably, the method 60 also comprises a step 500 consisting in refining the surface Si of each aspherical component by furthermore incorporating a second-order spherical aberration so as to further improve image quality according to the preset criterion.

Typically, the preset criterion consists in minimizing a wavefront error WFE.

Figure 24:
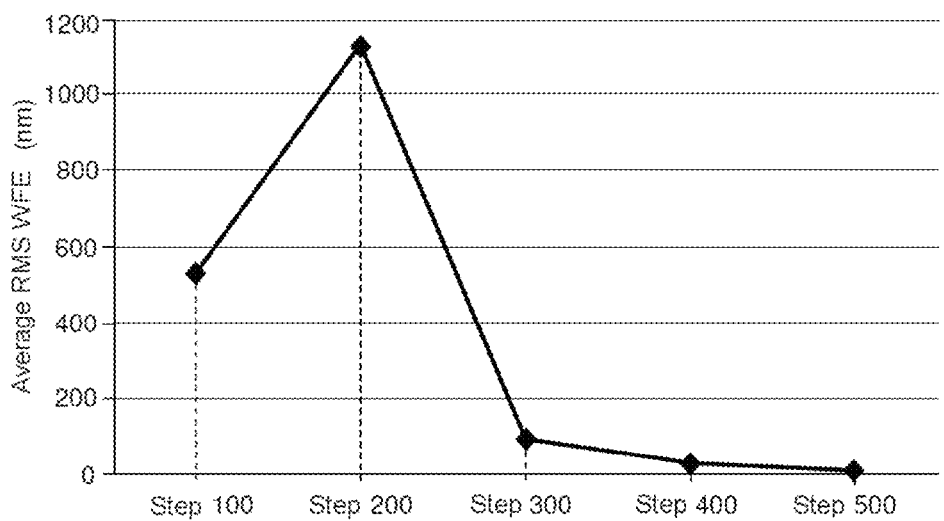
FIG. 24 illustrates the variation in the WFE averaged over the various focal lengths, after each step of the method.

FIG. 24 illustrates the variation in the RMS WFE averaged over the various focal lengths at the end of each step of the method, i.e. as a function of the various modifications made to the optical system, for the example telescope configuration given above.

The WFE obtained after the first optimization based on the Korsch equations is about 560 nm, incompatible with the RMS WFE constraint<50 nm. By modifying the conicity value of M3 in order to modify the sign of the astigmatism, the WFE is degraded (as yet no aspherical compensating components). In contrast, by introducing for each focal length an aspherical component the surface of which comprises first-order spherical aberration and defocus, the WFE is greatly improved to about 100 nm. The modification of the conicities of M1 and M2 allows the WFE to be decreased below about fifty nm, and the final optimization, introducing second-order spherical aberration, allows it to be further decreased to about ten nm.

The invention claimed is:

1. A three-aspherical-mirror anastigmat telescope comprising at least a concave first mirror, a convex second mirror, a concave third mirror and a first detector, and having an optical axis, the three mirrors being arranged so that the first mirror and the second mirror form from an object at infinity an intermediate image between the second mirror and the third mirror, the third mirror forming from this intermediate image a final image in a first focal plane of the telescope, in which plane the first detector is placed, the first, second and third mirrors being of a set form characterized by at least a radius of curvature and a conicity, the telescope furthermore comprising:

a displacement device adapted for moving the third mirror linearly along the optical axis of the telescope so as to make the focal length of the telescope change to a plurality of focal lengths between at least a minimum focal length and a maximum focal length, the telescope having at the minimum focal length a first exit pupil in a first position, and the telescope having at the maximum focal length a second exit pupil in a second position, a plurality of aspherical optical components respectively associated with the plurality of focal lengths, said components being respectively placed in a plurality of positions located between the first and second position, each aspherical component being placed on an optical path of a beam corresponding to said associated focal length when the telescope is working at said associated focal length, and off the optical path associated with another focal length when the telescope is working at said other focal length, an optomechanical device adapted for changing the optical path, which optomechanical device is placed between the aspherical components and the first detector and configured so that said first detector remains positioned in the first focal plane of the telescope, third mirror having conicity, called new conicity, determined from an initial conicity, the initial conicity being determined from the Korsch equations, the new conicity being determined so that the telescope has, in the absence of said aspherical components and for the minimum and maximum focal lengths, aberrations which are astigmatism and coma, said aberrations being compensable by said aspherical components, the position and the form of the surface of each aspherical component being determined so as to correct said compensable aberrations of said telescope for the associated focal length and to optimize image quality in the first focal plane of the telescope according to a preset criterion, said form of the surface of each aspherical components comprising first order spherical aberration and defocus.

2. The telescope as claimed in claim 1, wherein said form of the surface of each aspherical component comprises first-order spherical aberration and defocus.

3. The telescope as claimed in claim 2, wherein said form of the surface of each aspherical component furthermore comprises a second-order spherical aberration in order to further improve image quality according to said criterion.

4. The telescope as claimed in claim 1, wherein the new conicity differs from the initial conicity by more than 5% and by less than 30%.

5. The telescope as claimed in claim 1, wherein a new conicity of the first mirror and a new conicity of the second mirror are respectively determined from an initial conicity of the first mirror and an initial conicity of the second mirror, the initial conicities being determined from the Korsch equations, the new conicities being determined so as to further improve the image quality of said telescope according to said criterion.

6. The anastigmat telescope as claimed in claim 1, wherein the compensable aberrations are astigmatism and coma.

7. The telescope as claimed in claim 1, wherein:

a positive astigmatism is defined as an astigmatism for which a tangential focal point is located before a sagittal focal point, a negative astigmatism is defined as an astigmatism for which a sagittal focal point is located before a tangential focal point, a positive coma is defined as a coma for which a shape of the image spot of a point source is a "comet" the tail of which is directed away from the optical axis and, a negative coma is defined as a coma for which a shape of the image spot of a point source is a "comet" the tail of which is directed toward the optical axis, the compensable aberrations being positive astigmatism and positive coma for the maximum focal length, and positive astigmatism and negative coma for the minimum focal length.

8. The telescope as claimed in claim 1, wherein:
a positive astigmatism is defined as an astigmatism for which a tangential focal point is located before a sagittal focal point,
a negative astigmatism is defined as an astigmatism for which a sagittal focal point is located before a tangential focal point, and
wherein the new conicity of the third mirror is determined so as to modify the sign of the astigmatism of the telescope for the minimum focal length, in the absence of aspherical optical components.

9. The telescope as claimed in claim 1, wherein the preset criterion consists in minimizing a wavefront error.

10. The telescope as claimed in claim 1, wherein said positions of the aspherical components are separated from one another by 50 mm at most.

11. The telescope as claimed in claim 1, wherein at least one aspherical optical component is retractable so as to be placed on the optical path of the beam corresponding to the associated focal length when the telescope is working at said associated focal length, and off the optical paths associated with the other focal lengths when the telescope is working at one of these other focal lengths.

12. The telescope as claimed in claim 11, wherein the aspherical optical components are retractable mirrors.

13. The telescope as claimed in claim 12 wherein the retractable mirrors are mounted on a single holder, the positions of the retractable mirrors then being substantially identical.

14. The telescope as claimed in claim 13, wherein said aspherical components are retractable mirrors mounted on a single holder, said holder further comprising a position in which no retractable mirror features on the optical path of the beam incident on said holder, the beam then passing through the holder along a secondary optical path, the telescope further comprising:
an optical device placed on the secondary optical path and configured to generate a second focal plane of the telescope corresponding to a chosen focal length, said optical device further being configured to correct said compensable aberrations of said telescope and to optimize the image quality in the second focal plane of the telescope according to said preset criterion and,
a second detector placed in the second focal plane of the telescope, and sensitive in a second spectral band that is different from a first spectral band of sensitivity of the first detector.

15. The telescope as claimed in claim 14, wherein the optical device is designed to work in transmission in the second spectral band, wherein the first spectral band is comprised in the visible and the second spectral band is comprised in the infrared, and wherein the chosen focal length has a value lower than the minimum focal length.

16. The telescope as claimed in claim 1, wherein at least one aspherical component is a plate working in transmission.

17. The telescope as claimed in claim 1 having only two focal lengths, the minimum focal length and the maximum focal length.

18. A method for determining parameters of a three-aspherical-mirror anastigmat telescope comprising a concave first mirror, a convex second mirror, a concave third mirror, a first detector, a plurality of aspherical components and a displacement device adapted for moving the third mirror linearly along an optical axis of the telescope so as to make the focal length of the telescope change to a plurality of focal lengths between at least a minimum focal length and a maximum focal length,
the three mirrors being arranged so that the first mirror and the second mirror form from an object at infinity an intermediate image between the second mirror and the third mirror, the third mirror forming from this intermediate image a final image in the first focal plane of the telescope in which the first detector is placed, the first, second and third mirrors being of a set form characterized by at least a conicity and a radius of curvature,
the telescope having at the minimum focal length a first exit pupil in a first position, and the telescope having at the maximum focal length a second exit pupil in a second position,
the plurality of aspherical components respectively being associated with the plurality of focal lengths, each aspherical component being placed on an optical path of a beam corresponding to said associated focal length when the telescope is working at said associated focal length, and off the optical path associated with another focal length when the telescope is working at said other focal length,
said aspherical components being respectively placed in a plurality of positions located between the first and second position,
the method comprising steps of:
determining values termed initial values, for the conicities and radii of curvature of the first, second and third mirrors of said telescope, that are compatible with the minimum focal length and the maximum focal length, in the absence of said aspherical components, from the Korsch equations, via a first optimization of the image quality in the first focal plane of the telescope according to a preset criterion,
determining a conicity value for the third mirror, from the initial conicity of the third mirror, with which value the telescope has, in the absence of said aspherical components and at the minimum and maximum focal lengths, aberrations which are astigmatism and coma, said aberrations being compensable by the aspherical components respectively associated with said minimum or maximum focal lengths,
determining a new conicity value for the third mirror, the position and the form of the surface of each aspherical component via a second optimization, so as to correct said compensable aberrations and to optimize the image quality in the first focal plane of the telescope according to the preset criterion,
the form of said surfaces of the aspherical components comprising at least first-order spherical aberration and defocus.

19. The method as claimed in claim 18, further comprising a step of determining a new conicity for the first and second mirrors so as to further improve image quality according to the preset criterion.

20. The method as claimed in claim 19, further comprising a step of refining the determined form of the surface of each aspherical component by furthermore incorporating a second-order spherical aberration so as to further improve image quality according to the preset criterion.

* * * * *